United States Patent [19]
Bosco et al.

[11] Patent Number: 5,191,522
[45] Date of Patent: Mar. 2, 1993

[54] INTEGRATED GROUP INSURANCE INFORMATION PROCESSING AND REPORTING SYSTEM BASED UPON AN ENTERPRISE-WIDE DATA STRUCTURE

[75] Inventors: James J. Bosco, Newington; David H. Annis, Weatogue, both of Conn.; Kathleen M. Prouty, Granville, Mass.

[73] Assignee: ITT Corporation, New York, N.Y.

[21] Appl. No.: 467,843

[22] Filed: Jan. 18, 1990

[51] Int. Cl.⁵ .............................................. G06F 15/42
[52] U.S. Cl. ..................................... 364/401; 364/408
[58] Field of Search ................................ 364/401, 408

[56] References Cited

U.S. PATENT DOCUMENTS

| | | | |
|---|---|---|---|
| 4,766,539 | 8/1988 | Fox | 364/401 |
| 4,831,526 | 5/1989 | Luchs et al. | 364/401 |
| 4,837,693 | 6/1989 | Schotz | 364/408 |
| 4,930,071 | 5/1990 | Tou et al. | 395/600 |

Primary Examiner—Gail O. Hayes
Attorney, Agent, or Firm—White & Case

[57] ABSTRACT

An integrated information storage processing and reporting system for processing and supervising a plurality of group insurance accounts was contructed with a single enterprise-wide relational data base. The system provides sales, underwriting, administration and actuarial functions through integrated program-controlled data processing systems specific for each function and communicating with a group insurance account data bank. Each function is accessible through a single integrated workstation.

7 Claims, 14 Drawing Sheets

TABLE NAME

| TABLE IDENTIFIER | ATTRIBUTE 1 | ATTRIBUTE 2 | ATTRIBUTE 3 | |
|---|---|---|---|---|
| pk | | | | ← COLUMNS CONSTRAINTS |
| | | | | ← RECORD 1 |
| | | SAMPLE | | ← RECORD 2 |
| | | DATA | | ← RECORD 3 |
| | | | | ⋮ etc. |
| | | | | |

LEGEND FOR COLUMN CONSTRAINTS:

pk  PRIMARY KEY (*nn, nd* ALSO APPLY)
pk+ CONCATENATED PRIMARY KEY (*nn, nd* ALSO APPLY)
fk  FOREIGN KEY
fk+ CONCATENATED FOREIGN KEY
nn  NO NULLS ALLOWED IN COLUMN
nd  NO DUPLICATE VALUES ALLOWED IN COLUMN

FIG. 10

INTEGRATED GROUP INSURANCE INFORMATION PROCESSING AND REPORTING SYSTEM BASED UPON AN ENTERPRISE-WIDE DATA STRUCTURE

BACKGROUND OF THE INVENTION

This invention relates to enterprise-wide data structures for relational data bases and their use in constructing enterprise-wide integrated information processing and reporting system. The invention also provides, in a specific embodiment an information storage, processing and reporting system which integrates the sales, underwriting, administration, claims and actuarial functions that support and service the sale and administration of group insurance products.

The traditional approach of developing data bases and processing systems has been to develop an individual single application data base and data processing system for each of the business functions. Such a traditional approach to data base design has been used to date in the group insurance industry.

For example, the sale and support of group insurance products such as group health care insurance, and the administration of the group insurance program involve a large amount of information processing and reporting. The major types of group insurance products are Life; Accidental Death and Dismemberment; Long Term Disability,; Medical; Dental; and Weekly Disability. The volume of data that must be stored and processed includes the specific parameters of each group insurance plan for each policy holder (e.g., employer) in addition to data on different member groups of that policy holder, and individual group members covered by the plan and their eligible benefits. The scope of coverage for each of the individuals covered under a given plan may also vary. Due to the complexity of the products and the large amount of data, the administration of such group insurance programs presently entails the use of many complex data processing and management processes and systems.

In general, the data bases and processing systems currently in use to administer such group insurance plans are actually aggregations of unconnected individual systems each of which has a limited function. The amount of data shared or exchanged among the components of existing systems is minimal. These current systems are usually old and were designed and installed to support and service an earlier generation of insurance products that did not require processing of the amount of information associated with the insurance products offered today. The organization of these existing systems makes it very difficult and expensive to modify and integrate them.

For example, the sales of group insurance policies would be processed on a sales data processing system and the claims from existing policies would be processed separately on a claims data processing system. Each of these different data processing systems would also be developed based on its own data structures which were often not compatible. Due to the different data structures the various systems must be individually interfaced with each other. This has proven to be expensive and inefficient. In addition, since these current systems were developed as discrete systems, they also have redundant support requirements and are fraught with inconsistencies and operational inefficiencies. For these reasons, the current systems are incapable of efficiently supporting, or being modified to support, the new product development, administration and regulatory reporting requirements of the insurance industry today.

Accordingly, it is an object of this invention to provide a fully integrated information storage, processing and reporting system which will function as a single respository for sales, underwriting, actuarial and management information, for an enterprise and as a single source for processing and reporting it. The invention achieves this objective by developing the system based on a single data structure model for a relational data base which is compatible with and accessible to all of the applications programs of the enterprise-wide system. The system will provide automated sales support, e.g., tracking and reporting proposals; integrated underwriting tools; improved administration systems (e.g., billing), issuance of certificates, etc.; elimination of redundant data capture; and integrated actuarial tools. The system will improve operations by providing work management tools such as integrated case tracking and status reporting, and by providing on-line reference material, such as underwriting guidelines and legislative bulletins.

SUMMARY OF THE INVENTION

The invention provides a method of constructing, and a system comprising, an integrated information processing and reporting system for a specific enterprise, which system contains a single relational data base established at the onset, and encompassing all of the data requirements of the enterprise.

The key to the integrated system is its single enterprise-wide relational data base. Various application program modules also stored in the integrated system can accept and process data contained in one or more of the separate tables of the single relational data base. This unique data structure composed of relational tables, established at the outset in a single relational data base allows the system to operate more efficiently while at the same time allowing for the implementation of security measures which restrict the access of certain system users to particular data.

The data structure is developed by rigorously analyzing the business and data requirements of the entire enterprise. During the first stage of the development, the entities about which data is to be gathered are identified and a data item that distinguishes a unique occurrence of each entity is selected to serve as a primary key.

The relationships between entities are also identified, and documented in the table format and entered into entity-to-entity relationship tables in the computer storage means memory. The tables of the data base are in the format of rows and columns. Since the data base is relational, each of its tables will have a column that is the same as a column of at least one other table.

The attributes that describe each entity are determined and normalized. After normalization, the attributes are documented in the entity relationship tables and data concerning each attribute is entered into the relational data base in the storage means.

A data dictionary which defines the entities and attributes and includes an index of the tables is then compiled and entered into the storage means to complete the relational data base. After the tables have been constructed a first level graphic model depicting all of the entities and their relationships is produced.

The operational relationship between each of the entities is then determined for each entity-to-entity relationship and categorized so as to a form first level entity-relationship model.

The entities and relationships are then analyzed so as to produce a second level model. This entails grouping the entities into subject categories which correspond to the business objectives and use of the business data in the enterprise's business. The grouped entity-relationship tables or subject categories may then stored as clusters of tables in separate physical locations in the storage means.

Access to specific data or tables may then be limited to users of specific application programs. This allows the system to operate more efficiently since, by limiting the access of each application program only to the appropriate data cluster, the entire relational data base does not have to be searched while running that program. The limited access also offers advantages in security by limiting the access of certain users to the data base or portions thereof.

In a specific embodiment of the invention an enterprise-wide data structure and relational data base for an integrated group insurance information storage, processing and reporting system was constructed. The overall system comprises in combination, storage means for storing group insurance account data in the enterprise-wide data structure format, memory means, and a central processing unit. The system also contains a plurality of stored program-controlled application workstation sub-systems. By using the data structure of the invention the access of certain workstation subsystems to the data base can be restricted to certain subject category. Each application workstation sub-system concerns one of the following general functions: sales, underwriting, administration or actuarial. Each of the workstation sub-systems comprises a combination of specific stored program modules which are capable of inputting and processing data onto the single relational data base. The memory, data storage workstation subsystems and the stored program modules are accessible from an integrated computer workstation.

BRIEF DESCRIPTION OF THE FIGURES

FIG. 10 shows a sample of the table format into which the data is entered into the system relational data base.

DETAILED DESCRIPTION OF THE INVENTION

The integrated group insurance information reporting and processing system disclosed herein comprises a single enterprise-wide relational data base developed on a rigorously defined data structure model which is a representation of the data of the group insurance business as depicted by subjects, business entities and their relationships. The Group Administration Data Model documents the data which is required to support the various group insurance functions.

This single relational data base is composed of third normal form data tables as defined in, E. F. Codd, "Extending the Database Relational Model to Capture More Meaning" ACM Transactions on Database Systems, Vol. 4 Nov. 4, December 1979 pp. 397–434. The model was developed using an extended relational analysis approach to constructing relational data bases, such as the approach developed by Relational Systems Corporation Birmington, Mich. 48010 entitled ERA, Extended Relational Analysis, Version S.I. This approach uses a rigorous methodology to identify the business objects about which data is captured, ("entities"), and their business relationship. The aim of the approach is to construct third normal form relational data base model as as also described in E. F. Codd, "Further Normalization of the Data Base Relational Model", *Data Base Systems*, Randall Rustin, ed. 1972, pp 65–98. Prentice-Hall, Inc., Englewood Cliffs, N.J.

The basic premise of the methodology is to capture the business meaning of the data in a structure which will inherently support all usage in the present and contemplated in the future. As aspects of Group Administration business change, additions or changes may be introduced into the model so that it reflects an up-to-date depiction of the business data requirements. The data model comprises the organization of data based on the concepts of subjects, entities and their relationships.

Figure 1:
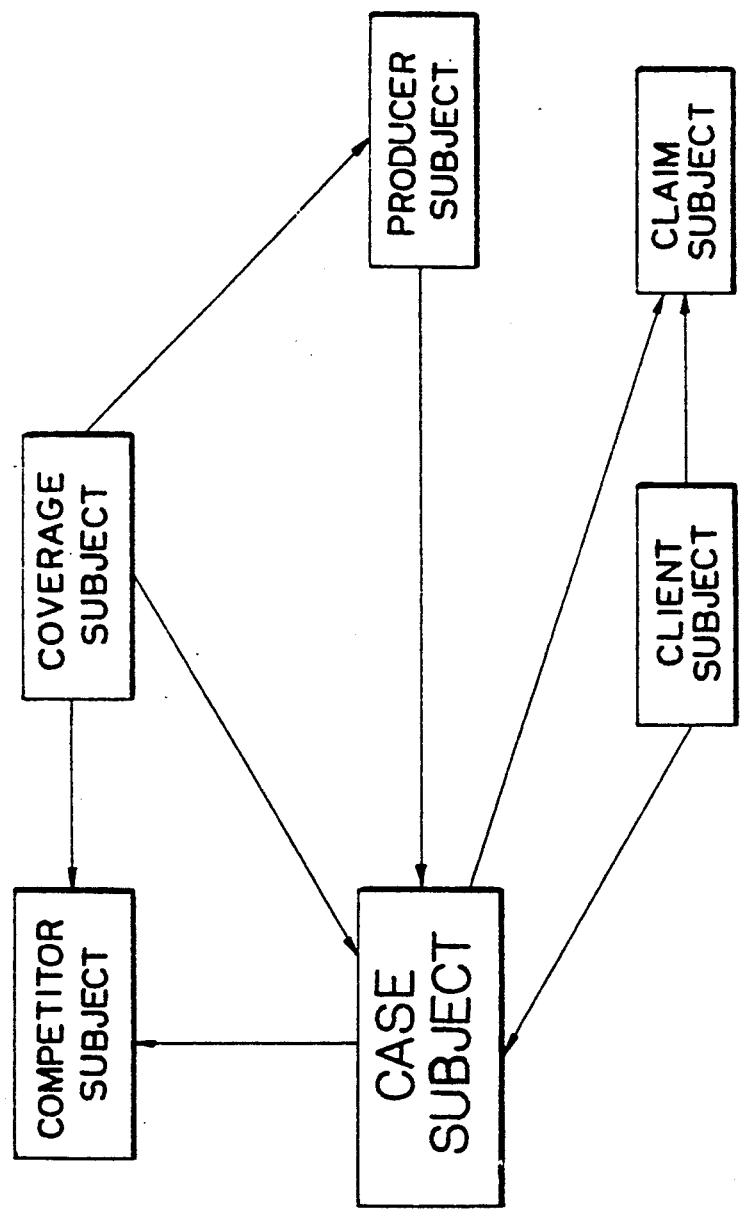
FIG. 1 shows the subject categories data structure of an automated integrated group insurance information storage, processing and reporting system.

A subject is an operating objective of the business enterprise on which data is collected and processed during the course of business. Each enterprise will have different subject categories. These subjects can only be determined by rigorously analyzing the business of the enterprise and determining which data categories are essential to the operation of that business. The subjects of the group insurance business which are the operating objectives of a specific embodiment of this invention are depicted in FIG. 1 and are more fully described below.

An entity as used in this data structure model is an object, e.g. a person, place or thing about which data is captured during the course of business.

A relationship is an association between entities which reflects a business rule or the behavior patterns of business entities.

In developing the data model each data element must be accurately identified and distinguished from all others. One set of commonly used data terminologies must also be used. This ensures that a consistent format and values are used to represent occurrences of data throughout the system.

To develop the data model the entity relationships of the subject objectives are determined and described by entity-relationship clauses.

An entity-relationship clause should have the following general format: Each Entity-A "may be" or "must be" in some relationship with, "one or more" or "one and only one" Entity-B(s). "Each"—means a single occurrence of Entity-A (one record/row in the sample of Table-A) (see FIG. 10). "May be"—means Entity-A may exist with or without a relationship to Entity-B. "Must be"—means in order for an occurrence of Entity-A to be valid, a relationship between Entity-A and Entity-B must exist.

The following are examples and descriptions of some entity relationship clauses:

(a) Each Client may be the owner of one or more Policies. Each Policy must be owned by one and only one Client.

The first sentence recognizes that one may not actually sell a policy to a client but that one wishes to still capture client information. The second sentence notes that the identification of a policy owner is required but there cannot be more than one owner.

(b) Each Participant may be responsible for one or more Dependents. Each Dependent must be insured under one and only one Participant.

The first sentence recognizes that a participant may never have any dependents. The second sentence states a business rule that a dependent must be tied to a participant. This also implies that if an individual is coincidently insured under two participants we must recognize this individual twice as two separate dependents.

(c) Each Policy/Bill must be associated by one and only one Policy to one and only one Bill. Each Policy may be associated to one or more Policy/Bills. Each Bill must be associated to one or more Policy/Bills.

The first sentence is a compound relationship clause to reflect a many-to-many association between Policy and Bill entities. A single occurrence of the association entity Policy/Bill maps the relationship of one Bill to one Policy. (Reading multiple rows of the Policy/Bill table will indicate all the bills for a specific Policy or all the policies for a specific bill). The second sentence recognizes that a policy may exist without a bill. The third sentence reflects that if a bill exists it must be mapped to at least one, but maybe more policies.

Once all of the entities of the enterprise are identified, each entity must be analyzed to determine whether it is within the scope of the system being developed. A table of the format depicted in FIG 10 is then constructed for each verified entity. The data is then entered into the system using the table generated by a relational data base management system program ("RDBMS"). In a specific embodiment of the invention the Table format and the Tables of the relational data base are generated by using the ORACLE Relational Data Base Management System. To implement this system a software package such as the Relational Data Base Management System ("RDBMS") produced by Oracle Corporation of Belmont, Calif. is used. Any other RDBMS may also be used in the invention. Example of such RDBMS programs are CYBASE TM of Cybase Corp., INGRES TM of Ingres Corp. and DB2 of IBM Corp.

In developing the data base for the integrated group insurance system of the invention, the following entities where identified and verified to be within the scope of the system. A table of the format depicted in FIG. 10 was provided for each of these entities.

Case Subject—Entities

APPLICANT: The participant (employee/member) or dependent who is requesting coverage under a specific case as a late entrant. This entity identifies are associated with a late entry application for group coverage. There may be several dependents in addition to one participant on a single application, and over time, any of the dependents or the participant may have submitted more than one application.

APPLICANT ACTIVITY: A historical record of every Group Medical Underwriting activity performed per applicant. This entity tracks by application ID insured person ID, activity code, and activity date the activities done to medically underwrite an individual. There may be numerous activities per applicant the information recorded per activity includes handled date, follow-up date, response received date, activity cost, and remarks.

APPLICATION: A late (non-enrollment period) request for coverage(s) from an eligible individual for personal insurance or dependent insurance. Information in this entity includes reference to the policy the application is written under and dated indicating when and by whom the application was processed. The actual coverages requested per applicant will be contained in the Selected Coverage entity.

BILL: A request for payment of contractual amounts due for services and/or insurance. This entity identifies the billee (the client and/or covered person) and includes a system assigned bill number. The detail bill amounts and coverages billed are not in this entity (see BILL DETAIL entity).

BILL DETAIL: Specific payments due per coverage category or coverage within a single bill. For each bill, several costs of different coverages may be due; this entity identifies all items payable and associates them with a single bill.

CASE: The association of all components of a plan of insurance for a client. This is the "cornerstone" entity of the Case Subject, providing the system assigned case ID number and identifying the associated client and sales office. Also included are various activity processing dates and information used to characterize the case. Each case is unique to a single client, but over time a client may have more than one case.

CASE COMMENTS: Narrative text recording remarks from processors assigned to the case. This entity stores multiple lines of text as needed per case.

CASE/COVERAGE: The coverages included on a specific case. This entity identifies which coverages are provided per the terms of a case and further identifies the policy each coverage is written under.

CASE/COVERAGE/FUNDING CONDITION: Identification of the conditions per funding method that the client has agreed to per coverage on the case. According to the Funding Conditions entity, for certain Funding Methods on a case the client must agree to certain conditions required by the Group Insurer. This entity specifies which of those conditions (per Funding Method per Coverage) are included on the case.

CASE/COVERAGE/FUNDING CONDITION OPTION: The specific amounts agreed to by the client for each condition specified per applicable Funding Method. Having determined the conditions to be inforce per each Funding Method on the case, the client must agree to one of the optional values of the conditions as offered by the Group Insurer in the Condition Option entity. This entity contains those chosen condition values for the case. Example: Attachment Point for Medical ASL=$500,000 (as opposed to an alternate choice of $1,000,000).

CASE/FUNDING/SERVICE: The specification of services to be provided on the case per each Funding Method that pertains to the case. This entity identifies which Services the client desires on the case in terms of each Funding Method utilized on the case.

CASE/PRODUCER: Identification of all producers responsible for a case (present and past) and all cases per each producer. This entity accounts for the fact that a producer may be associated with many cases and a case may be the responsibility of several producers, whether concurrently or over time. The entity identifies by key each case and producer and also provides an effective date for the association.

CASE/PRODUCER/COVERAGE: Information associating each producer involved in a case with each coverage provided by the case. The entity identifies per coverage which producers share in each coverage in terms of compensation and service responsibility. This entity specifically references which commission schedule applies per producer and coverage. This entity specifically references which commission schedule applies per producer and coverage.

CASE RATING HISTORY A historical record of each occasion that a case was rated or rerated during the proposal process. Included in this entity per case and rating date are the current rating system key, important processing dates, and identification of the home office underwriter who processed the case.

CASE REPRESENTATIVE: Identification of all sales and service representatives associated with each case. This entity records the fact that sales office representatives (sales and service) may work on many cases and each case may be the responsibility of more than one representative.

CASE STATUS HISTORY: A historical record of all status changes for a case as it is processed during the Pre-Sale function. This entity tracks each status code and date of status per case and records the sales office processor who entered the information.

CLASS COVERAGE SCHEDULE: The definition of each category of employees/members per coverage for the purpose of providing and differentiating benefits within a specific case. For each coverage on a case the policyholder established one or more classes of participants according to such criteria as salary, position, years of experience, grade level, etc. This entity records these definitions and thereby identifies which coverages an enrollee/applicant may select according to the characteristics of each enrollee/applicant. A class code is relevant only in terms of a specific coverage; in other words, class "1" Medical and class "1" Life may not be the same category definition.

CLASS/COVERAGE/FUNDING METHOD: The identification of the Funding Method per each class, coverage, policy, and client location. This entity established which funding methods per coverage on the case are located on which policies and is the level at which coverage rates can be determined and established.

CLASS PROVISION OPTION SCHEDULE: The allowable values per class provision from which the participant may select his or her own benefit levels per each offered coverage. This entity contains the value(s) per provision that the policyholder has chosen to make available to the participants according to coverage and class; each provision may have a single, required value (a mandatory default for all participants and dependents) or may allow for multiple options from which the applicant may choose his or her desired benefit. Example; the deductible on Comprehensive Dental is a flat $50 for all employees provided that coverage, but for AD&D coverage, the participant may select 1×Salary, 3×Salary, or 5×Salary as a benefit amount.

CLASS PROVISION SCHEDULE: Identification of the eligibility requirements and benefits associated with class and related coverage. This entity identifies which provisions are allowed per coverage and class for a specific case; these provisions may be mandatory (required default) or optional (applicant may select his or her desired provisions) according to the Group Insurer's rules and the negotiated rules governing the case.

PARTICIPANT/POLICY: Identification of all participants per policy under which they are covered. The entity simply associates all participant keys with all related policy keys.

POLICY: Information identifying and describing the legal contract between a client and the Enterprise that specifies which coverages and services are provided for what price(s). The Policy entity contains the system assigned policy ID, Enterprise assigned policy number, data regarding Funding Method (only one per policy), policy dates, and elements used to characterize the policy and associate it with other entities. A case may include several policies, but a policy applies to only one case.

POLICY BILL: Identification of the specific policy for which a bill has been generated for the collection of monies due. This entity reflects the fact that more than one bill may be required to collect money under a single policy (i.e., multiple coverages grouped under one policy but bill separately), and a bill may also represent money due on more than one policy.

SELECTED COVERAGE: Specific coverage chosen by an enrollee/applicant (employee/member or dependent) according to the terms of the Class Coverage Schedule offered by a case. This entity records per insured (participant or dependent) each coverage selected by that person. Specific benefits and benefit values selected by the enrollee/applicant are dependent upon this entity but are not components of this entity (see Selected Provision and Selected Provision Option entities).

SELECTED PROVISION: The specific benefits chosen by an enrollee/applicant per each coverage selected. Having specified the coverages desired, a new enrollee or applicant next selects from the Class Provision Schedule the types of benefits desired within each coverage (where a choice is available, otherwise the same benefit applies to each insured person for the same coverage and class). This entity records each provision chosen by the enrollee/applicant per each coverage.

SELECTED PROVISION OPTION: The specific values chosen by the insured from the options offered on a case for each provision per each coverage. This entity contains the specific values for an insured person for each benefit on a coverage according to the insured person's selection from the Class Provision Option Schedule. Example; the enrollee/applicant selects 3×Salary for an AD&D benefit and chooses $250 for a Medical deductible.

Case Subject—Minor Tables

APPLICATION ACTIVITY CODE: Provides codes and descriptions for each Group Medical Underwriting activity.

APPLICATION LETTER CODE: Provides codes and descriptions for each letter used in Group Medical Underwriting and contains all variable data requirements per letter.

CASE CORRESPONDENT CONTACT: This refers to the person or department designated as the primary recipient for all business correspondence regarding one or more cases. The contact may be a person or department within the policyholder's or producer's organization.

CASE INFORMATION REQUEST REASON CODES: Provides codes and descriptions for the reasons extra information may be requested by an underwriter while processing a case.

CASE FUND REASON CODES: Provides codes and descriptions for each reason that a coverage may be duplicated on a case but funded by a different funding method.

CASE STATUS CODES: Provides codes and descriptions of each type of status that a case may be in during pre-sale and immediate post-sale processing.

CASE TERMINATED REASON CODES: Provides codes and descriptions of each reason that a case may be terminated (declined by the Enterprise not taken by the client, or cancelled after the case had been sold).

Claim Subject—Entities

CLAIM: A request from a participant for reimbursement for an incurred procedure or loss. This entity captures information about a unique claim that identifies the claimant, policy and key claim dates.

CLAIM BENEFIT: A set of payable insurance amounts per claim filed due to the claimant and identified by benefit codes. For each claim, one or more benefits may be requested by the claimant; this entity specifies those liabilities.

Claim Subject—Entities—Minor Tables

BENEFIT CODES: Provides codes and description for each type of benefit (an amount payable per contractual obligations specified in an insurance policy). Examples include:

| | |
|---|---|
| 008 | Major Medical Reimbursement |
| 022 | Medicare Supplement |
| 042 | Basic Term life Rated Payment |

Client Subject

CLIENT: The external organization (company, association, or trust) to whom the Enterprise may (or may not) sell insurance and/or insurance services. This entity identifies and describes (name, address, industry type) existing and potential policyholders. Usual clients are Employers, Unions, Associations, and Trustees, where a Trustee is defined as several client companies associated together for the purpose of obtaining group insurance. The entity is the focal point of the Client subject and is identified by a system assigned key.

CLIENT LOCATION: A specific client physical/geographic place where participants are located. Examples of Client Location include Divisions, Plant, and Subsidiary; each location is dependent on a specific client. The entity contains location name and address information.

INSURED: A person (employee/member or dependent) with one or more in-force coverages provided under a Group Insurance plan. This entity provides descriptive information about individuals who have selected coverages made available to them as participants (or dependents of participants) in a Group Insurance plan. The information includes name, address, social security number, client (policyholder) identification, and any personal data required for underwriting purpose (age, sex, etc).

INSURED ROLE: The identification of an insured person's role on a specific case. This entity associates a role type with an Insured ID to record whether an insured plays the role of a participant, spouse, or child of the participant within a case. This entity allows for the fact that the same person may be insured on a single case both as a participant and as a dependent.

INSURED TYPE ROLE: The description of each role an individual may play on any case. This entity identifies and describes role types, such as participant, spouse, or child, that characterize an insured person on a case INSURED DEPENDENT ASSOCIATION: The identification of all familial relationships between insured persons. This entity associates one insured person with another (using Insured IDs) to define whether one is a spouse or child of the other.

Competitor Subject—Entities

COMPETITOR: Group coverage providers with who the Enterprise competes in the insurance marketplace. This entity identifies and describes each competing provider and includes a system assigned key and the company name.

COMPETITOR/CASE/COVERAGE: A competitor's rates for coverages which pertain to a Enterprise case for a client who is either requesting or cancelling Group Insurer coverages. For purposes of product and marketing analysis, this entity records the coverages and rates a competitor has in-force for a client for whom we are quoting coverage or the coverages and rates for a competitor who outbid the Enterprise on a specific case.

Coverage Subject—Entities

CONDITION: A set of variables that qualify and quantify certain Funding Methods. This entity identifies and defines all limits, requirements, and other variables which define Funding Methods. Examples; Reimbursement per cent, Reimbursement Accumulation Period, Maximum Indemnity, Attachment Point, Excess Risk Determination Factor, Retro Premium Limit Factor.

CONDITION OPTION: The Group Insurer—specified default value for a Condition that applies to a specific Funding Method for a specific Coverage. This entity contains one or more optional values for each Funding Condition according to the Coverage under consideration. In other words, the same Condition—s-pecified by the Funding Method—may apply to more than one Coverage, but the Group Insurer defined value for that option may be very different from one Coverage to the next. Examples; ISL DNTL Deductible options=$500, $1,000, $2,000; ISL MED Deductible options=$100,000, $200,000.

COVERAGE: A specific version of group insurance, defined as a unique type of coverage (such as Basic or Supplemental) within a major category of coverage (such as Life or Medical). This entity identifies specific insurance vehicles, which, when qualified by various funding methods, become the components of a plan of insurance, Examples; Basic Term Life, Statutory AD&D, Scheduled Dental, and Major Medical.

COVERAGE CATEGORY: A major line of group coverage the Enterprise's markets. A single coverage category may be marketed in the form of one or more distinct products. This entity contains codes and descriptions for each coverage category; examples include WD for Weekly Disability, MED for Medical.

COVERAGE CATEGORY/FUNDING METHOD: Allowable Funding Method (costing/management of risk) per each major line of coverage. This entity record the types of funding possible per each coverage category. Examples; LIFE FI, LIFE MPP, MED FI, MED ISL, WD ASO.

COVERAGE PROVISION: The set of all applicable benefits and eligibility requirements per each coverage. For each group insurance coverage, there is a finite set of qualifying criteria (Provisions) that define all the associated benefits and eligibility requirements. This entity identifies which criteria (provisions) apply to which coverage and inversely which coverages have the same provisions. Examples; BAS MED has Hospital Class Schedule, Room Limit, Coinsurance Rule, Medicare Integration, Deductible, etc, and BAS LIFE has Coverage Amount, Preexisting Condition Limit, Suicide Clause, etc. Provisions are completely dependent on the Coverage Category plus the Coverage Type (i.e., Coverage); in other words Medical provisions must be referred to as Basic Medical provisions or Comprehensive Medical provisions. Coverage Provisions are further defined by a set of options per provision per coverage (see Provision Option entity).

FUNDING CONDITION: The set of all applicable conditions per each Funding Method. Certain Conditions apply to certain Funding Methods (some to more than one Funding Method), and this entity identifies those relationships. Funding conditions are further defined by sets of options per coverage category (see Condition Option). To-date, Funding Conditions have only been found to apply ISL, ASL, and MOO funded coverages.

FUNDING METHOD: Specifies the way risk and case administration activities may be assumed, shared, or delegated (to the Enterprise) by the client. Specification of the funding method (per coverage) identifies whether the policyholder is fully insured (FI, MPP, FLEX), partially insured (ISL, ASL), or not at all insured (Self Insured—ASO, CSO) by the Enterprise for that coverage, and accordingly establishes the premium/expense accounting and administration activities required to maintain the case. A client who is not insured by the Enterprise (self insured) merely contracts for certain administrative services provided by the Enterprise. This entity contains codes and descriptions of the kinds of fund methods available.

FUNDING/SERVICE: The set of all applicable claim, administrative, actuarial, and underwriting services per each Funding Method. Regardless of the coverage involved, there are specific group insurance services provided by the Enterprise to administer a case (defined in Service Entity); these services are differentiated by the Funding Method applied to each coverage This entity defines which services correspond with which Funding Method, and inversely which Funding Methods utilize the same services. All services are provided on a Fully Insured (FI Funding Method) coverage; subsets of those services and certain alternative services are provided on coverages with alternate funding methods.

PROVISION: The specific criteria that qualify and quantify each coverage. This entity defines the entire set of variables available to be used within group coverages to define the features of each coverage. Provisions fall into two broad categories—Benefits and Eligibility Requirements. Examples; individual deductibles, class benefit schedules, waiting periods, medical evidence requirements, pooling factors.

PROVISION OPTION: An Enterprise—specified value for a provision for a specific coverage. This entity contains one or more values per each provision according to a specific coverage. A client would choose one of these standard default values during the design of the plan of insurance (case). For instance, the Enterprise may state that a Major Medical Deductible can be $100, $250 or $500; the client may choose the $250 option for all participants. Some options may allow for more than one value per coverage, others may be overridden at a case level with a unique value specified by the client (for instance, a $750 Major Med Deductible). Additional example; COMP DNTL Preventative Care Coinsurance, options=100%, 85%, or 80%.

SERVICE: An insurance activity that enables a coverage to be administered according to the funding method specified for that coverage. All group coverages are administered according to a common base of business activities that must be performed to fulfill the obligations inherent in policies written against the coverages. Although services provide the means to administer each coverage, they are fully specified by Funding Method only (see Funding/Service Entity). This entity identifies and defines the entire set of group insurance services available. Services include Claims (form design, claim payments, loss reporting, tax reporting, etc), Administration (participant management, billing, conversions, etc), Underwriting (plan design, medical underwriting, rating, etc) and Actuarial (cost projections, reserve estimates, etc).

Producer Subject—Entities

COMMISSION SCHEDULE: Identification of the producer compensation plans according to Funding Method type. This entity identifies and describes the types of schedules to be used for producer compensation, but contained no specifics as to compensation rates. The actual commission rate information per producer type is contained in the Commission Schedule/Producer Type entity.

COMMISSION SCHEDULE/COVERAGE: The association of all valid commission schedules with coverages. A commission schedule may apply to more than one coverage, and a single coverage may provide producer compensation based on one or more commission schedules. This entity identifies which coverages are associated with which commission schedules and vice versa.

COMMISSION SCHEDULE/PRODUCER ROLE TYPE: Standard commission rates per each commission schedule type differentiated by producer roles. This entity provides all commission rate (%) as they are broken down by commissionable agent role type (GA, SGA, and WA). Within agent role, the rates are provided for varying annual premium levels, either first year or rates are provided for varying annual premium levels, either first year or renewal. Within the first year or renewal categories the rates are differentiated between person (direct) production or intermediate (indirect) production.

PRODUCER: A person or organization paid commissions and/or fees for the sale and/or service of the Enterprise's group insurance products. Using a system assigned key, this entity identifies and describes each Enterprise producer. Information includes name, address, Enterprise producer code, and federal tax number (if available). Producer can be categorized into 3 subtypes;

a. PRODUCER COMPANY: An organization, such as an administrative services provider, an insurance agency, or brokerage firm paid by the Enterprise for sales and or services rendered.

b. PRODUCER PERSON: Individuals who are affiliated with a Producer Company and serve as representatives or "contacts" for that company but are not directly compensated by the Enterprise. Each individual is recursively related within the entity to his or her (one and only one) respective Producer Company.

c. SOLE PROPRIETOR: An independent/self-employed agent or GA unaffiliated with any Producer Company and directly paid by the Group Insurer for sales and/or services rendered.

PRODUCER CONTRACT: A formal agreement between a producer and the Enterprise as to the specific group product(s) the producer may sell. This entity is identified by a system assigned key and identifies—via relationship to the Producer Contract/Coverage Category entity—which coverages a producer is authorized to sell on the Enterprise's behalf. A given producer may have more than one contract and may act in the capacity of more than one producer role type.

PRODUCER CONTRACT/COVERAGE CATEGORY: The identification of all Coverage Categories included in each and every Producer Contract. A producer's contract may include more than one Coverage Category (Life, Med, LTD, etc), and each Coverage Category is included in any Producer Contracts. This entity identifies all association between the Producer Contract and Coverage Category entities.

PRODUCER ROLE TYPE: Categories of producers, used to differentiate compensation levels and working relationships. This entity provides codes and descriptions for each role level of producer (e.g., WA—Writing Agent, GA—General Agent, SGA=Special General Agent, TPA=Thirty Party Administrator).

Miscellaneous—Entities

THE ENTERPRISE COMPANY: statutory companies. This entity contains the established numeric identifiers and descriptive names of each of the Enterprise writing companies.

PROCESSOR: An Enterprise employee responsible for entering information into a business system. This entity identifies staff who are legitimate users or any given system.

REINSURER: A company that assumes a portion of a coverage risk on a case. This entity identifies and describes (name and address) those companies with whom we place our reinsurable business.

REPRESENTATIVE: Enterprise sales office employee who supports the sale and/or administration of Group cases. A representative may act as either a sales rep or a service rep or both, where a sales representative assists in case development and the proposal process and a service re assists in case installation and renewal processing. There may be more than one representative assigned to each case (differentiated by rank/experience level). This entity identifies and describes each rep in each sale office, using a system assigned key.

SALES AREA: A region of the country within which group coverages are sold and for which sales performance is monitored. This entity is keyed by established Enterprise region numbers and includes the name of each region.

SALES OFFICE: An office within a sales area through which group coverage is sold and cases are maintained. This entity contains corporately defined office codes and names.

STATE: The geographic/legal components of the United States. This entity identifies each state (2 character, formal Postal Service designated abbreviation) and provides the full state name.

Once the entities were identified the relationships between the entities were determined by rigorously analyzing the business and objectives of a specific group insurance enterprise.

FIGS. 2-9 graphically depict the entity relationship clauses of each of the business subjects of the Group Insurance Enterprise first level subject data model shown in FIG. 1. The graphic model was produced after all of the entity-relationships have been determined and described by entity-relationship clauses.

Case Subject—Entity Relationship

Figure 2:
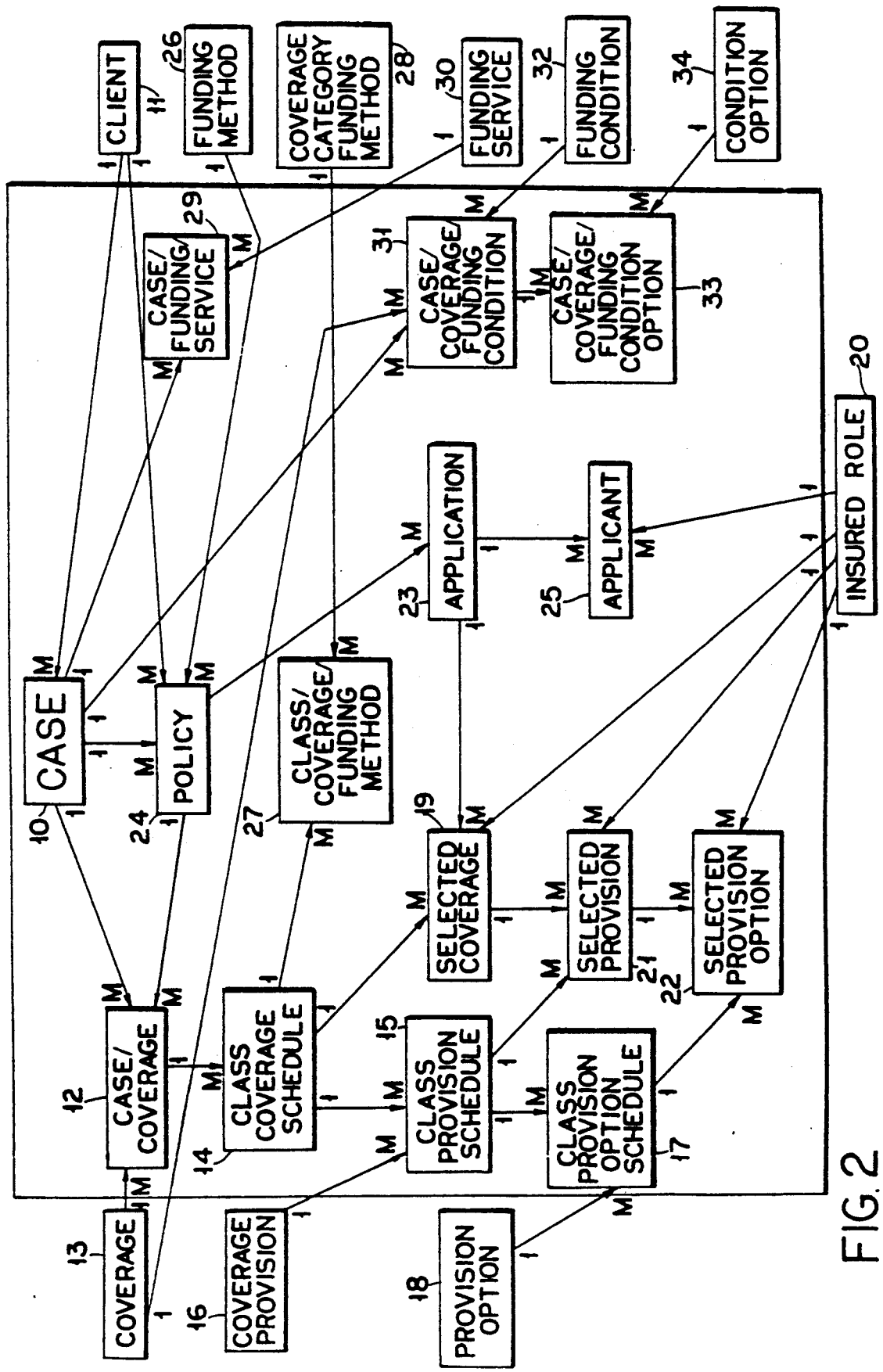
FIG. 2 shows a portion of the entity-relationship model of the Case subject category of the data structure of a group insurance information storage, processing and reporting system.

Referring to FIG. 2 which depicts the Case subject entity-relationships.

Each Case 10 must be the account of one and only one Client 11. Each Client 11 may be the owner of one or more Cases 10.

Each Case/Coverage 12 must be associated to one and only one Coverage 13 and to one and only one Case 10. Each Coverage 13 may be associated to one or more Case/Coverages 12. Each Case 10 may be associated to one or more Case/Coverages 12.

Each Class Coverage Schedule 14 must be associated to one and only one Case/Coverage 12 and to one and only one class code. Each Case/Coverage 12 may be associated to one or more Class Coverage Schedules 14. Each class code may be associated to one or more Class Coverage Schedules 14.

Each Class provision Schedule 15 must be associated to one and only one Class Coverage Schedule 14 and one and only one Coverage Provision 16. Each Class Coverage Schedule 14 may be associated to one or more Class provision Schedules 15. Each Coverage Provision 16 may be associated to one or more Class Provision Schedules 15.

Each Class Provision Option Schedule 17 must be associated to one and only one Class Provision Schedule 15 and to one and only one provision Option 18. Each Class Provision Schedule 15 may be associated to one or more Class Provision Option Schedules 17. Each Provision Option 18 may be associated to one or more Class Provision Option Schedules 17.

Each Selected Coverage 19 must be associated to one and only one Class Coverage Schedule 14 and to one and only one Insured Role 20. Each Class Coverage Schedule 14 may be associated to one or more Selected Coverages 19. Each Insured Role 20 may be associated to one or more Selected Coverages 19.

Each Selected Provision 21 must be associated to one and only one Class Provision Schedule 15 and to one and only one Insured Role 20. Each Class Provision Schedule 15 may be associated to one or more Selected provisions 21. Each Insured Role 20 may be associated to one or more Selected Provisions 21.

Each Selected Provision Option 22 must be associated by one and only one Class Provision Option Schedule 17 and to one and only one Insured Role 20. Each Class Provision Option Schedule may be associated to one or more Selected Provision Options 22. Each Insured Role 20 may be associated to one or more Selected Provision Options 22.

Each Selected Coverage 19 may be associated to one and only one Application 23. Each Application 23 may be associated to one or more Selected Coverages 19.

Each Application 23 may be filed on one and only one Policy 24. Each Policy 24 may be responsible for one or more Applications 23.

Each Applicant 25 must be associated to one and only one Application 23 and one and only one Insured Role 20. Each Application 23 and may be filed for one or more Applicants 25. Each Insured Role 20 may be associated to one or more Applicants 25.

Each Case 10 may be issued as one or more policies 24. Each Policy 24 must be issued for one and only one Case 10.

Each Policy 24 may be the aggregation of one or more Case/Coverages 12. Each Case/Coverage 12 may be applicable to one and only one Policy 24.

Each Funding Method 26 may be the funding vehicle for one or more Policies 24. Each Policy 24 may be funded by one and only one Funding Method 26.

Each Class/Coverage/Funding Method 27 must be associated to one and only one Class Coverage Schedule 14 and to one and only one Coverage Category/Funding Method 28. Each Class Coverage Schedule 14 may be associated to one or more Class/Coverage/Funding Methods 27.

Each Coverage Category/Funding Method 28 may be associated to one or more Class/Coverage/Funding Methods 27.

Each Case/Funding Service 29 must be associated to one and only one Case 10 and one and only one Funding Service 30. Each Case 10 may be associated to one or more Case/Funding Services 29. Each Funding Service 30 may be associated to one or more Case/Funding Services.

Each Case/Coverage/Funding Condition 31 must be associated to one and only one Case 10 and to one and only one Coverage 13 and to one and only one Funding Condition 32. Each Case 10 may be associated to one or more Case/Coverage/Funding Conditions 31. Each Coverage 13 may be associated to one or more Case/Coverage/Funding Conditions 31. Each Funding Condition 32 may be associated to one or more Case/Coverage/Funding Conditions 31.

Each Case/Coverage/Funding Condition Option 33 must be associated to one and only one Case/Coverage/Funding Condition. Each Case/Coverage/Funding Condition 31 must be associated and to one and only one Condition Option 34. Each Case/Coverage/Funding Condition 31 may be associated to one or more Case/Coverage/Funding Condition Options 33. Each Condition Option 34 may be associated to one or more Case/Coverage/Funding Condition Options 33.

Figure 3:
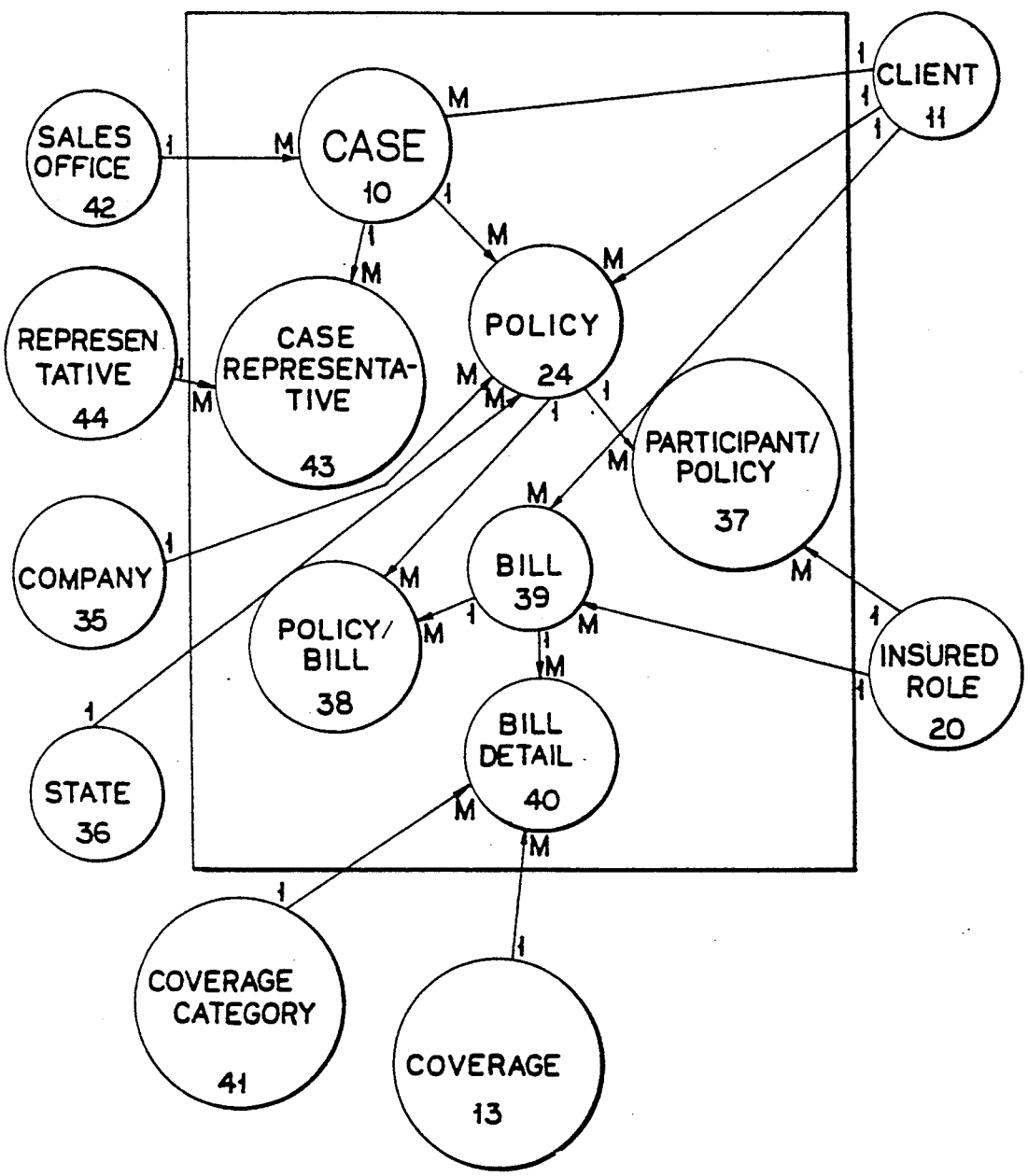
FIG. 3 shows a portion of the entity-relationship model of the Case subject category of the data structure of a group insurance information storage, processing and reporting system.

Referring to FIG. 3 which depicts additional Case subject relationship, each Policy 24 must be owned by one and only one Client 11. Each Client may be the owner of one or more Policies.

Each Policy 24 must be written by one and only one Enterprise Company 35. Each Enterprise Company 35 may be the writer of one or more Polices 24.

Each Policy 24 must be written in one and only one State 36. Each State 36 may be the issuing state of one or more Policies 24.

Each Participant/Policy 37 must be associated to one and only one Insured Role 20 (employee) and to one and only one Policy 24. Each Insured Role 20 may be associated to one or more Participant/Policies 37. Each Policy 24 must be associated to one or more Participant/Policies 37.

Each Policy/Bill 38 must be associated to one and only one Policy 24 and to one and only one Bill 39. Each Policy 24 may be associated to one or more Policy/Bills 38. Each Bill 39 must be associated to one or more Policy/Bills 38.

Each Client 11 may be the billee of one or more Bills 39. Each Bill 39 may be billed to one and only one Client 11.

Each Insured Role 20 may be the billee of one or more Bills 39. Each Bill 39 may be billed to one and only one Insured Role 20.

Each Bill Detail 40 must be associated by one and only one Bill 39, to one and only one Coverage Category 41 or to one and only one Coverage 13. Each Bill 39 may be associated to one or more Bill Details 40. Each Coverage Category 41 may be associated to one or more Bill Details 40. Each Coverage 13 may be associated to one or more Bill Details 40.

Each Case 10 must be maintained by one and only one Sales Office 42. Each Sales Office 42 may be responsible for one or more Cases 10.

Figure 4:
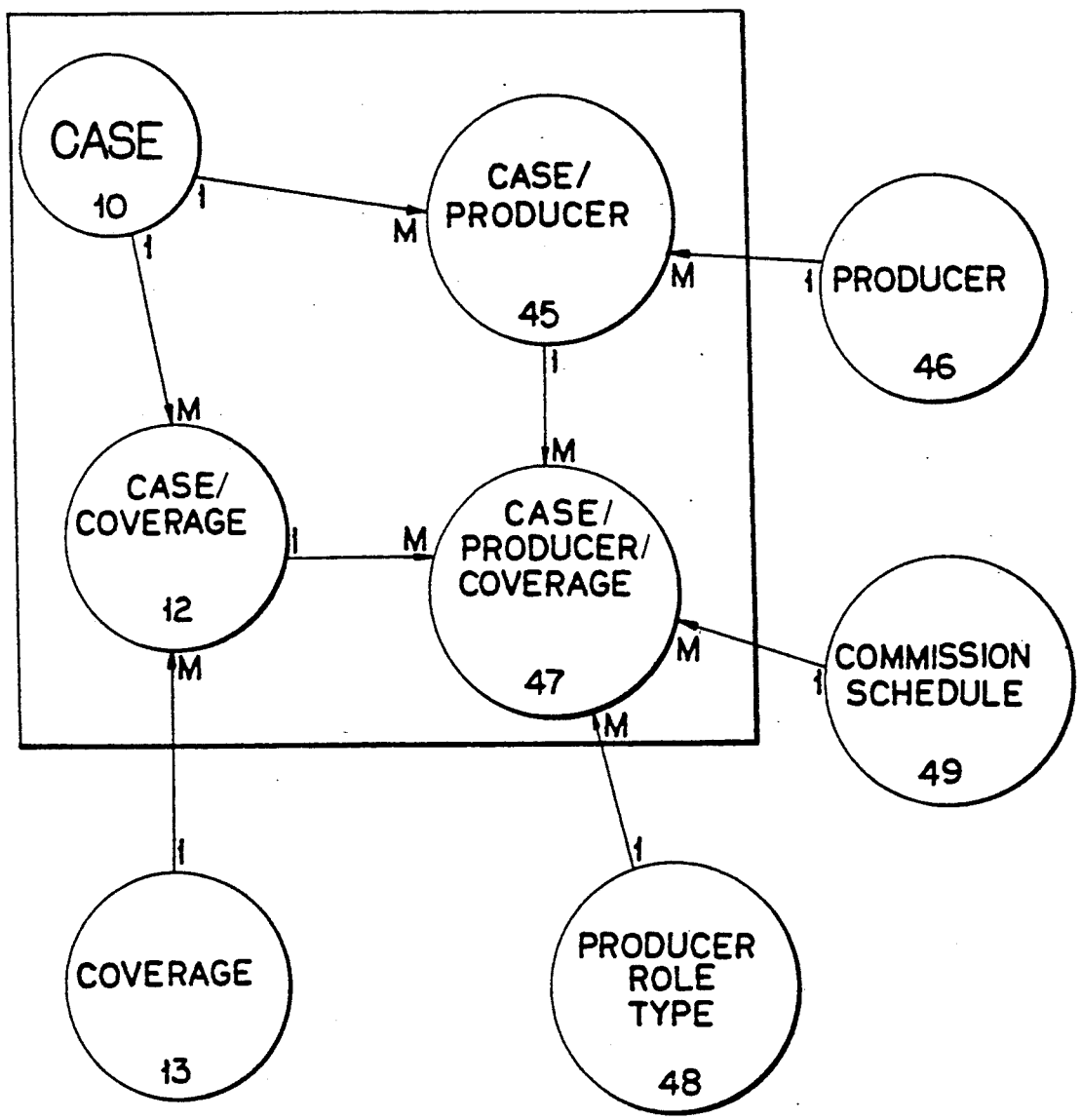
FIG. 4 shows a portion of the entity-relationship model of the Case subject category of the data structure of a group insurance information storage, processing and reporting system.

Each Case/Representative 43 must be associated to one and only one Representative 44 providing sales or service support to one and only one Case 10. Each Case 10 may be associated to one or more Case/Representatives 43. Each Representative 44 may be associated to one or more Case/Representatives 43. Referring to FIG. 4 which depicts further case subject relationships, each Case/Producer 45 must be associated by one and only one Case 10 and to one and only one Producer 46. Each Case 10 may be associated to one or more Case/Producers 45. Each Producer 46 may be associated to one or more Case/Producers 45.

Each Case/Producer/Coverage 47 must be associated by one and only one Case 10, and to one and only one Producer 46 and to one and only one Coverage 13. Each Case 10 may be associated to one or more Case/Producer/Coverages 47. Each Producer 46 may be associated to one or more Case/Producer/Coverages 47. Each Coverage 13 may be associated to one or more Case/Producer/Coverages 47.

Each Case/Producer/Coverage 47 may be associated to one and only one Producer Role Type 48. Each Producer Role Type 48 may be associated to one or more Case/Producer/Coverages 47.

Each Case/Producer/Coverage 47 may be associated to one and only one Commission Schedule 49. Each Commission Schedule 49 may be associated to one or more Case/Producer/Coverages 47.

Claim Subject—Entity Relationships

Figure 5:
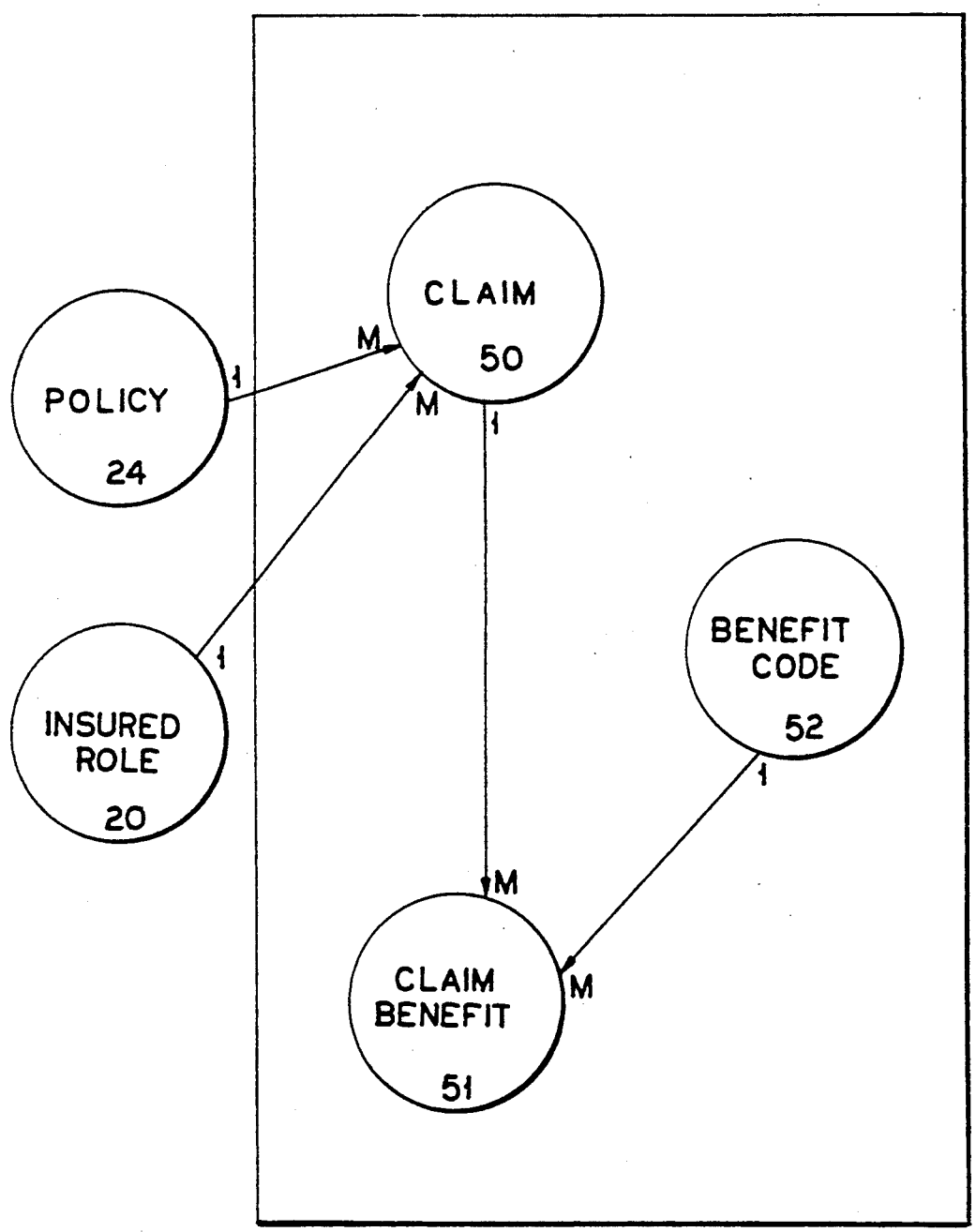
FIG. 5 shows the entity-relationship model of the Claims subject category of the data structure of a group insurance information storage, processing and reporting system.

Referring to FIG. 5 which depicts the claim subject relationships, each Claim 50 must be incurred for one and only one Policy 24. Each Policy 24 may be obligated for one or more Claims 50.

Each Claim 50 must be requested by one and only one Insured Role 20. Each Insured Role 20 may be the claimant on one or more Claims 50.

Each Claim Benefit 51 must be associated to one and only one Claim 50 and to one and only one Benefit Code 52. Each Claim 50 must be divided into one or more Claim Benefits 51. Each Benefit Code 52 may be assigned to one or more Claim Benefits 51.

Client Subject—Entity—Relationship

Figure 6:
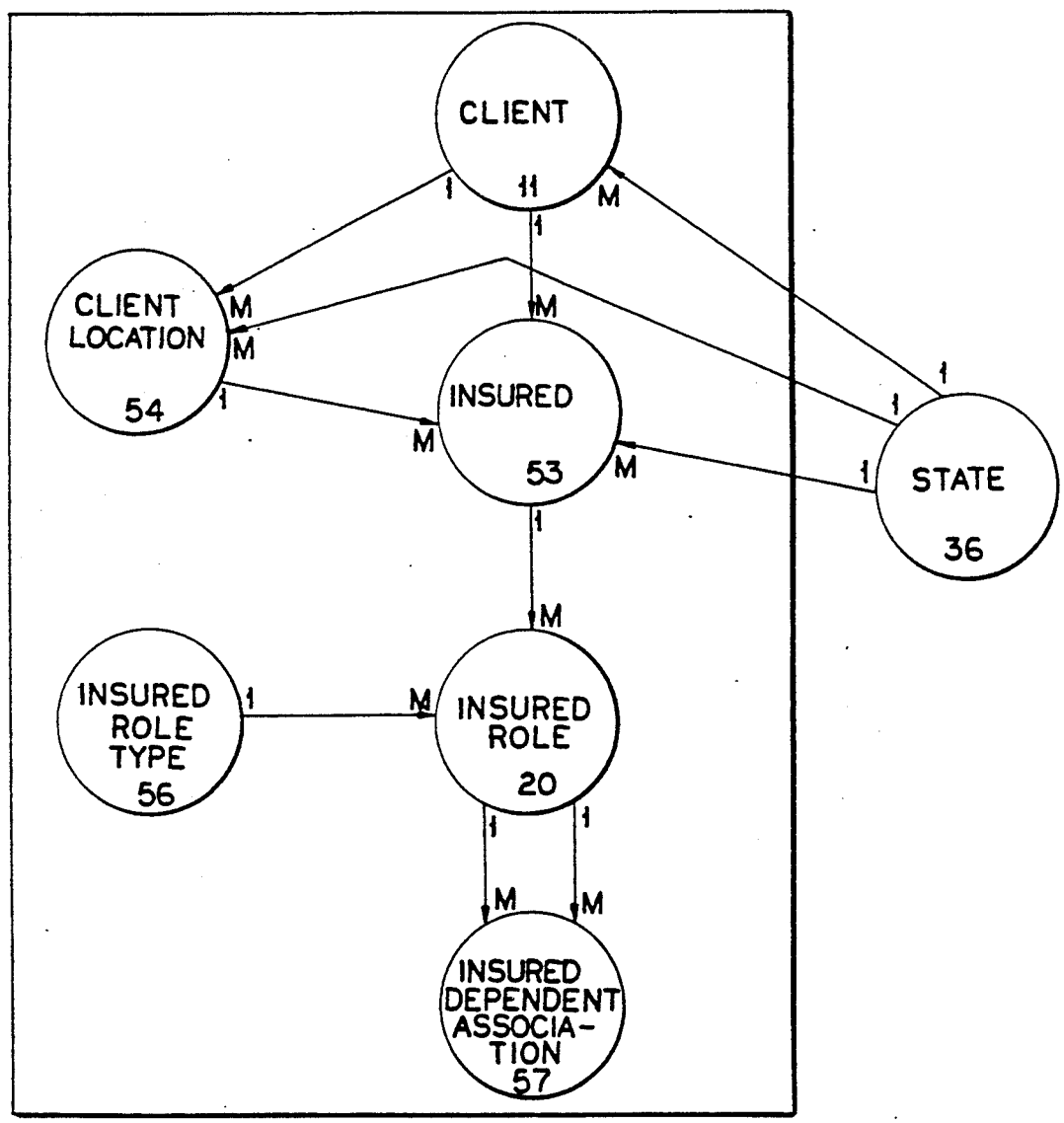
FIG. 6 shows the entity-relationship model of the Client subject category of the data structure of a group insurance information storage, processing and reporting system.

Referring to FIG. 6 which depicts Client subject relationships, each Client 11 may be the administrator of one or more Insureds 53. Each Insured 33 must be covered by one and only one Client 11.

Each Client 11 may be responsible for one or more Client Locations 54. Each Client Location 54 must be affiliated with one and only one Client 11.

Each Client Location 54 may be the work location of one or more Insureds 33. Each Insured 33 may be located in one and only one Client Location 54.

Each Client 11 must be located in one and only one State 36. Each State 36 may be the location of one or more Clients 11.

Each Client Location 54 must be located in one and only one State 36. Each State 36 may be the location of one or more Client Locations 54.

Each Insured 53 may be located in one and only one State 36. Each State 36 may be the location of one or more Insured 53.

Each Insured Role 20 must be associated by one and only one Insured 53 to one and only one Insured Role Type 50. Each Insured 53 may be playing one or more Insured Roles 20. Each Insured Role Type 56 may be applicable to one or more Insured Roles 20.

Each Insured Dependent Association 57 must be associated by one and only one Insured Role 20 (employee) to one and only one Insured Role 20 (spouse or child). Each Insured Role (employee) 20 may be associated to one or more Insured Dependent Associations 57.

Each Insured Role 20 (spouse or child) may be associated to one or more Insured Dependent Associations 57.

Competitor Subject—Entity Relationships

Figure 7:
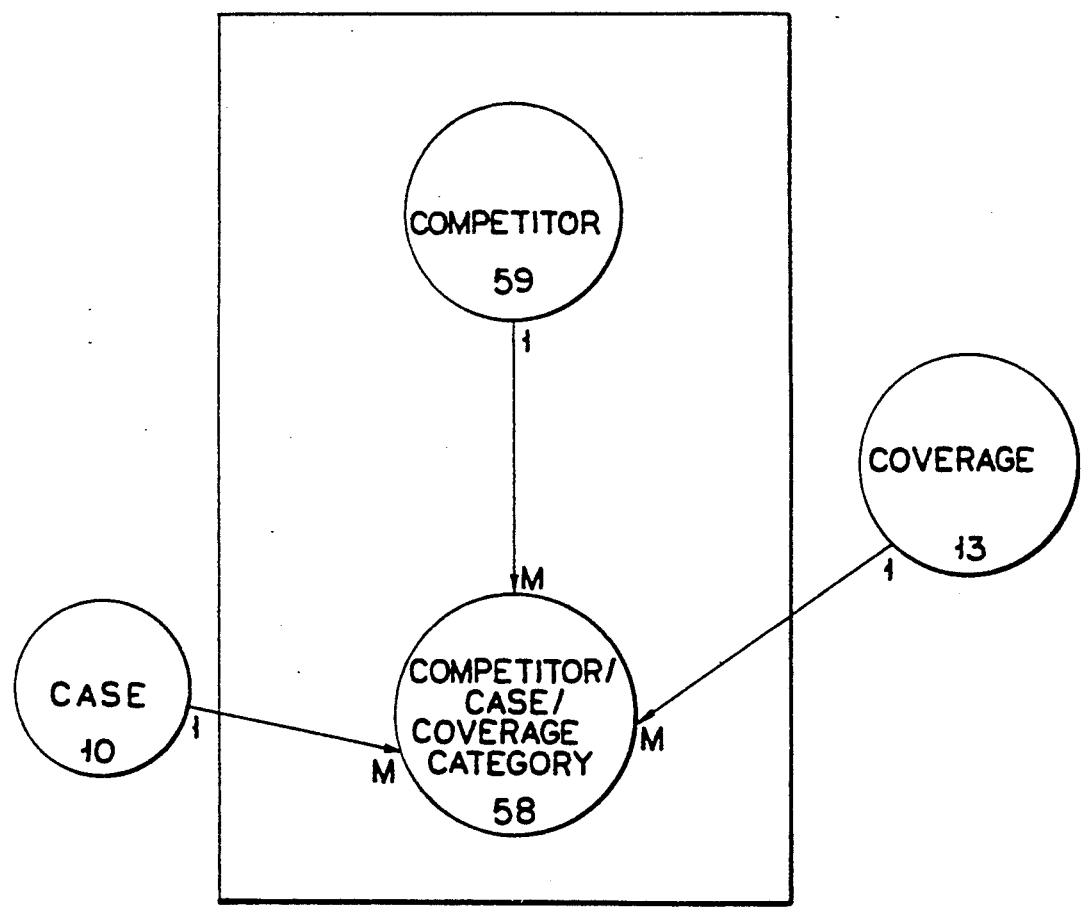
FIG. 7 shows the entity-relationship model of the Competitor subject category of the data structure of a group insurance information storage, processing and reporting system.

Referring to FIG. 7 which depicts the competitor subject entity-relationships each Competitor/Case/Coverage 58 must be associated by one and only one Competitor 59 who competed in one and only one Case for one and only Coverage 13. Each Competitor may be associated to one or more Competitor/Case/Coverages 58. Each Case 10 may be associated to one or more Competitor/Case/Coverages 58. Each Coverage 13 may be associated to one or more Competitor/Case/Coverages 58.

Figure 8:
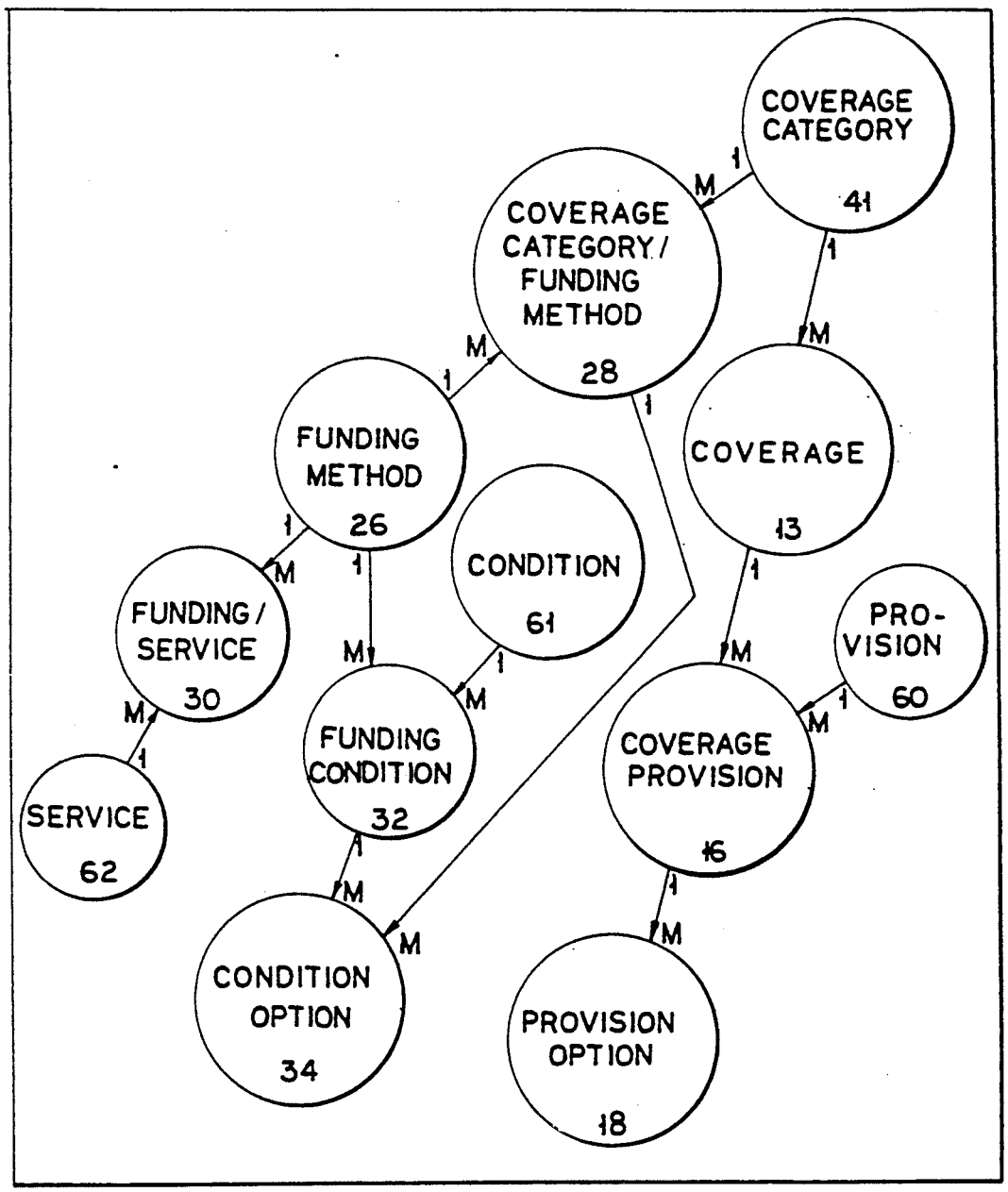
FIG. 8 shows the entity-relationship model of the Coverage subject category of the data structure of a group insurance information storage, processing and reporting system.

Referring to FIG. 8 which depicts coverage subject entity-relationships, each Coverage Category 41 may be an aggregation of one or more Coverages 13. Each Coverage 13 must be aggregated by one and only one Coverage Category 41.

Each Coverage/Provision 16 must be associated to one and only one Coverage 13 and to one and only one provision 60. Each Coverage 13 may be associated to one or more Coverage/ Provisions 16. Each Provision 60 must be associated to one or more Coverage/Provisions 16.

Each Coverage Provision 16 may be characterized by one or more Provision Options 18. Each Provision Option 18 may be applicable to one and only one Coverage Provision 16.

Each Coverage Category/Funding Method 28 must be associated to one and only one Coverage 13 funded by one and only one Funding Method 26. Each Coverage Category 41 may be associated to one or more Coverage Category/Funding Methods 28. Each Funding Method 26 may be associated to one or more Coverage Category/Funding Methods 28.

Each Funding Condition 32 must be associated with one and only one Funding Method 26 and to one and only one Condition 61. Each Condition 61 may be associated to one or more Funding Conditions 32. Each Funding Method 26 may be associated to one or more Funding Conditions 32.

Each Condition Option 34 must be associated by one and only one Funding Condition 32, to one and only one Coverage Category/Funding Method 28 and for a particular condition option number. Each Funding Condition 32 may be associated to one or more Condition Options 34. Each Coverage Category/Funding Method 28 may be associated to one or more Condition Options 34.

Each Funding/Service 30 must be associated with one and only one Funding Method 26 to one and only one Service 62. Each Funding Method 26 may be associated to one or more Funding/Services 30. Each Service 62 may be associated to one or more Funding/Services 30.

Producer Subject—Entity Relationship

Figure 9:
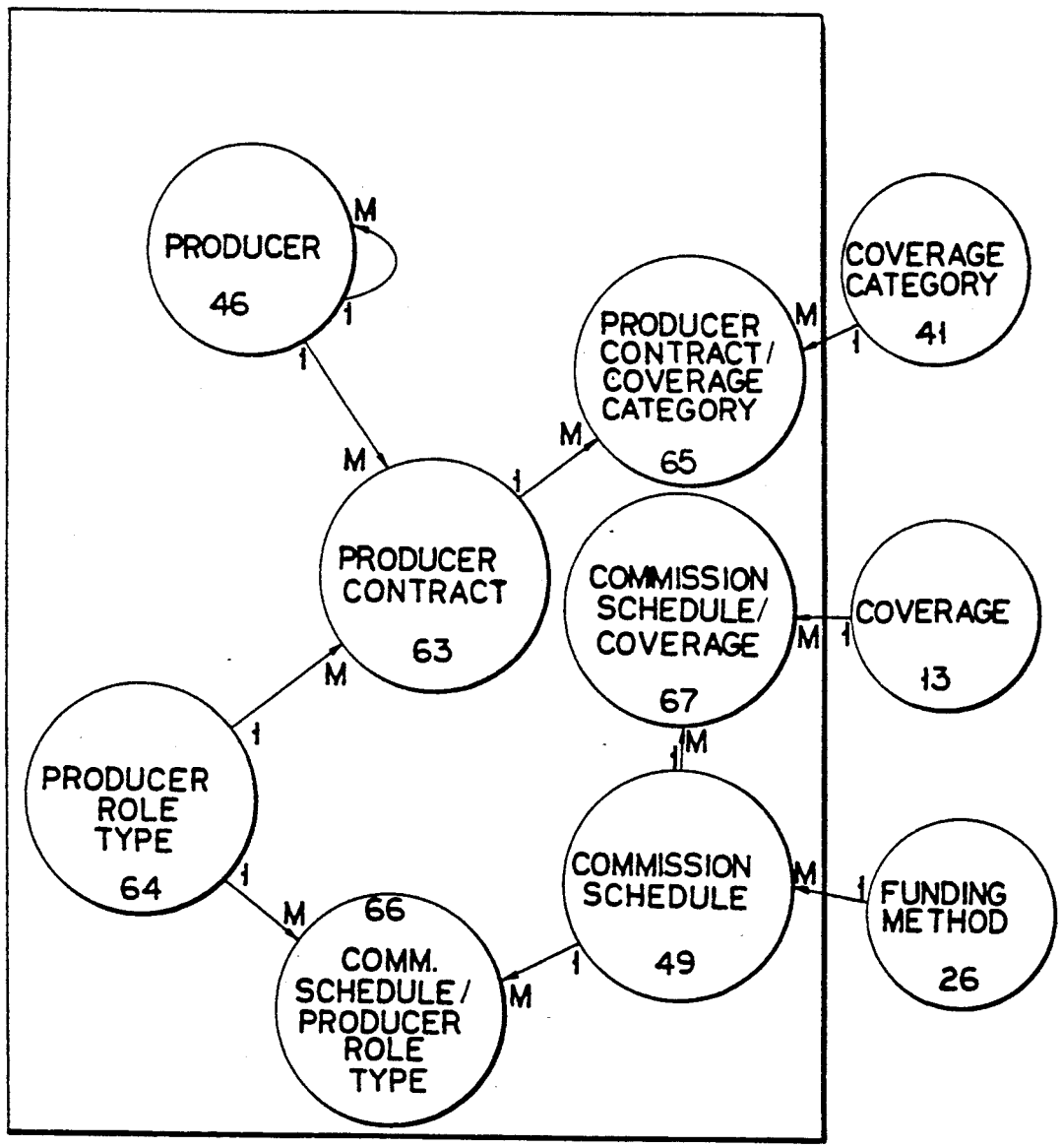
FIG. 9 shows the entity-relationship model of the Producer subject category of the data structure of a group insurance information storage, processing and reporting system.

Referring to FIG. 9 which depicts the producer subject entity-relationships. Each Producer 46 (organization) may be affiliated to one or more Producers 46 (individuals). Each Producer 46 (individual) may be affiliated to one and only one Producer 46 (organization).

Each Producer 46 may be the owner of one or more Producer Contracts 63. Each Producer Contract 63 must be owned by one and only one Producer 46.

Each Producer Contract 63 must be for one and only one Producer Role Type 64. Each Producer Role Type 64 may be at the level of one or more Producer Contracts 63.

Each Producer Contract/Coverage Category 65 must be associated with one and only one Producer Contract 63 to one and only one Coverage Category 41. Each Producer Contract 63 may be associated to one or more Producer Contract/overage Categories 65. Each Coverage Category 41 may be associated to one or more Producer Contract/Coverage Categories 65.

Each Commission Schedule/Producer Role Type 66 must be associated with one and only one Commission Schedule 49 to one and only one Producer Role Type 64. Each Commission Schedule 49 may be associated to one or more Commission Schedule/ Producer Role Types 66. Each Producer Role Type 64 may be associated to one or more Commission Schedule/Producer Roles Types 66.

Each Commission Schedule/Coverage 67 must be associated with one and only one Commission Schedule 49 to one and only one Coverage 13. Each Commission Schedule 49 may be applicable to one or more Commission Schedule/Coverages 67. Each Coverage 13 may be associated to one or more Commission Schedule/Coverages 67.

Each Commission Schedule 49 may be applicable to one and only one Funding Method 26. Each Funding Method 26 may be associated to one or more Commission Schedules 49.

SUBJECT CATEGORIES

FIG. 1 outlines the subject categories corresponding to the operating objectives of a group insurance business. In order to determine these subject operating objectives, the group insurance business of a specific "Enterprise" was rigorously analyzed. The graphic representation of the entity-relationships in FIG. 2-9 were used as a modeling aid in order to cluster the entities and tables within the subject categories depicted FIG. 1. The rectangles of FIGS. 2-9 graphically depict the boundaries of the subject categories.

Once the entities have been grouped according to subject categories the tables concerning these entities may be stored on the data storage means in separate physical locations as clusters. The clustering of data in this fashion enables the system to operate more efficiently and allows for the more efficient implementation of security and operator data access measures. In some instances, however, the frequent use of certain tables within a category cluster, e.g. the Case subject cluster, may lock-up the tables in the entire cluster on a frequent basis and reduce access to the cluster and the efficiency of the system. In such a situation it is preferred that the tables within that category should not be clustered so as not to unduly restrict access to all the tables in the category.

Referring to FIG. 1, the Case subject describes a complete plan of insurance for a client at a point in time. The Case subject is comprised of entities that identify (1) basic case descriptive information, including activity history and coverages available; (2) policy level information, including participant details, in-force (selected) coverages, and billing information; and (3) producer information that identifies the relationships between producers (agents, TPA's broker/dealers) and coverages to provide commission and commission split details for the coverage of each case.

The Case Subject is the largest and most complex of all the subjects within the Group Administration Data Model, simply because it is the point at which all other subjects inter-relate to support all aspects of the Group Insurance business.

The Claim subject concerns requests from a participant for reimbursement for an incurred procedure or loss. This subject contains information about claims tracked to the benefit level. Relationships from the Case Subject indicate the policy under which a claim is filed. Relationships from the Client Subject identify the claimant. The claim information, including relationships from the Case and Client Subjects, enable the validation of claims and the analysis of losses.

The Client subject concerns external legal entities such as a business, company or trusts to whom insurance or insurance services may be sold. The Client subject provides descriptive information regarding the companies, associations or organizations with whom business is transacted. The subject is comprised of entities that describe the client (who may be either a prospective or established policy-holder), the locations of the client's workplaces (where applicable), and the persons who are associated with that policyholder and are referred to as the "Insured". Supporting entities identify the roles and relationships of the Insured persons.

Many elements of the Case Subject are directly dependent on relationships from the Client Subject. Primary among these are the relationships between the Client and the Case, the Case policies, available coverages, and participant and dependent selected coverages. The bill, which is found within the Case Subject, may be related to the client, the participant, and/or the dependent, depending on who the bill recipient, a billee, is according to the terms of the insurance policy.

The Competitor subject contains the identification of and descriptive information about competitors. The Competitor Subject contains information about other Group Insurance companies, this information being used for sales performance analysis. Coverage and rate information is tracked for competitors who win business away from the Enterprise. Data is captured regarding coverage rates per case per competitor.

The Coverage Subject contains rules and options that define and describe Group products marketed by the Enterprise, which include plans of insurance and related insurance services. The Coverage Subject contains all the business elements necessary to define the coverages and services that comprise a group product that may be offered in a case; in other words, the Coverage Subject establishes what may be sold, and the Case Subject represents instances of actual sold products (or sold "packages" of products). Key entities are Coverage Category (Medical, Life, Dental, Long Term Care, Disability Income, AD&D), Coverage (Coverage Category further qualified by Coverage Type, such as Basic, Comprehensive, Supplemental, etc) and Funding Method (Fully Insured, Stop Loss, Admin Services Only, Minimum Premium Plan).

Every product sold by the Enterprise is defined in terms of Coverage and Funding Method. For each Coverage there are various Provisions, which describe eligibility and benefit criteria and include optional established default values (e.g., Deductible amount, $50 or $100). For each Funding Method there are various Services that are group insurance business functions necessary to administer each product (e.g., Claims Processing, Loss Reporting). For both each Coverage and Funding Method there are specific Conditions that define certain rules and restrictions for the Funding Method and quantify them for the Coverage (e.g., Aggregate Stop Loss Attachment Point, Life=$100,000, Medical=$250,000).

The Producer subject defines a person or firm empowered by an individual or agency contract with the Enterprise to sell and/or administer the users Group products. This subject has two major components, one a set of entities that identifies and describes each producer (defined as a person or organization) and each associated contract, the other a set of entities that defines each type of producer e.g. a writing agent, Group Administrator, Special Group Administrator, broker-dealer), stipulates all commission schedules (compensation rates), and identifies the schedules that pertain to each producer type. The Commission Schedule entity provides rates for standard case agreements and also includes rates for producers acting in a supporting role on a case.

The Producer Subject relates to the Case Subject in order to establish a link to the producer responsible for a case on a per coverage per case basis. Because a case may be the responsibility of more than one producer, there may be unique commission split agreements that are tracked at a coverage per case level. On a per case basis, the standard commission schedules may be overridden and special fee arrangements may be negotiated. All commission details unique to a case are found within the Case Subject but the key relationships are from the Producer Subject.

Any relational data base management system program may be used to manage the data base. The relational data base management system program preferably uses a Structured Query Language ("SQL"), a fourth generation computer language. The SQL package contains various program tools which may be utilized in the invention. The most important of these program tools are: SQL*PLUS, a program for creating, modifying, storing and maintaining the data base; SQL*CALC, a program with standard spreadsheet capabilities which can also access and manipulate data base information; SQL*FORMS, a program to design screens; SQL*RPT, a report writing tool; SQL*GRAPH, a business graphics feature; and SQL*MENU, an easy-to-use menu design facility. In a preferred embodiment of the invention the relational data base management program is the systems program ORACLE.

Figure 11:
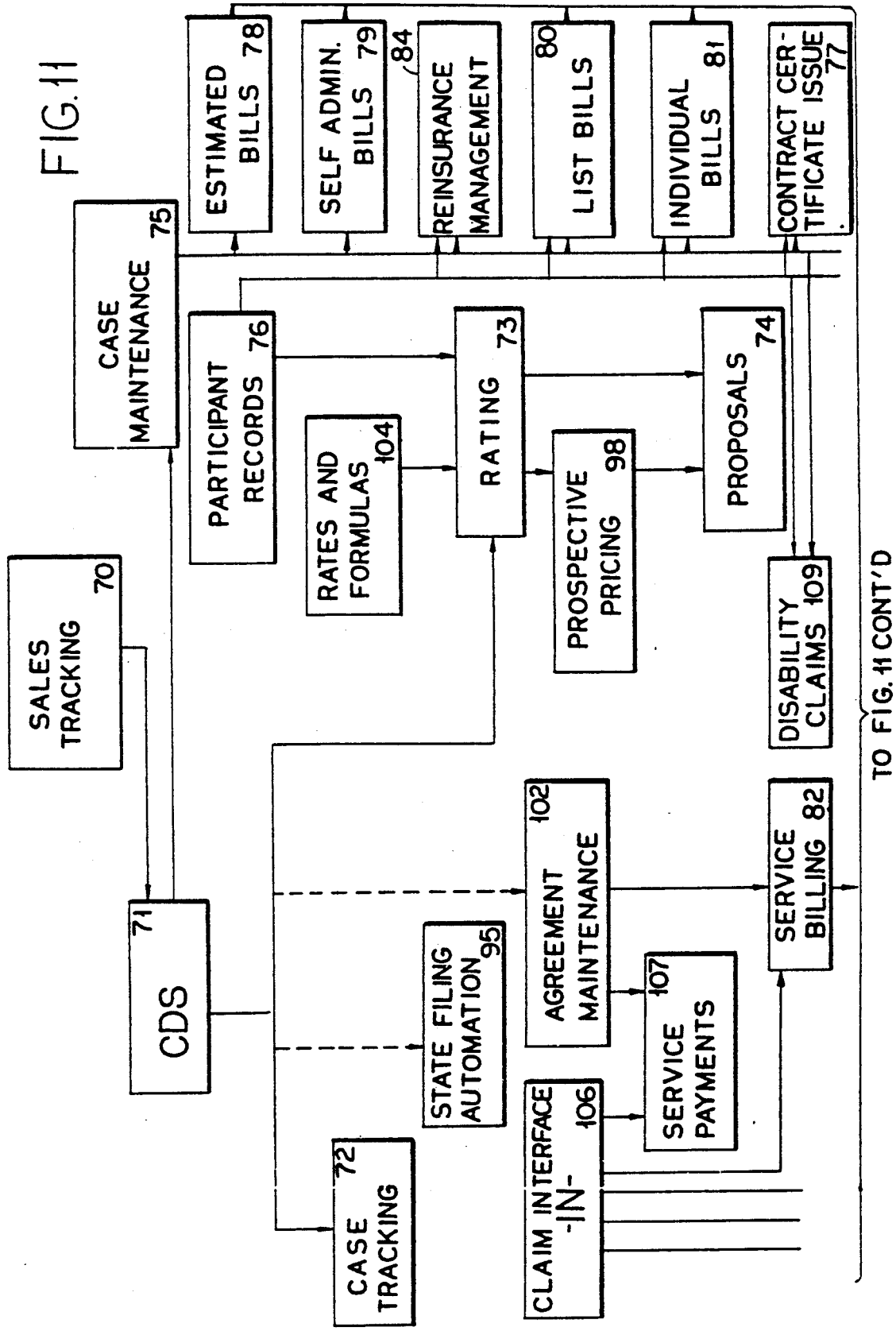
FIG. 11 shows the basic functional applications programs of the automated integrated group insurance information storage processing and reporting system.
Figure 11:
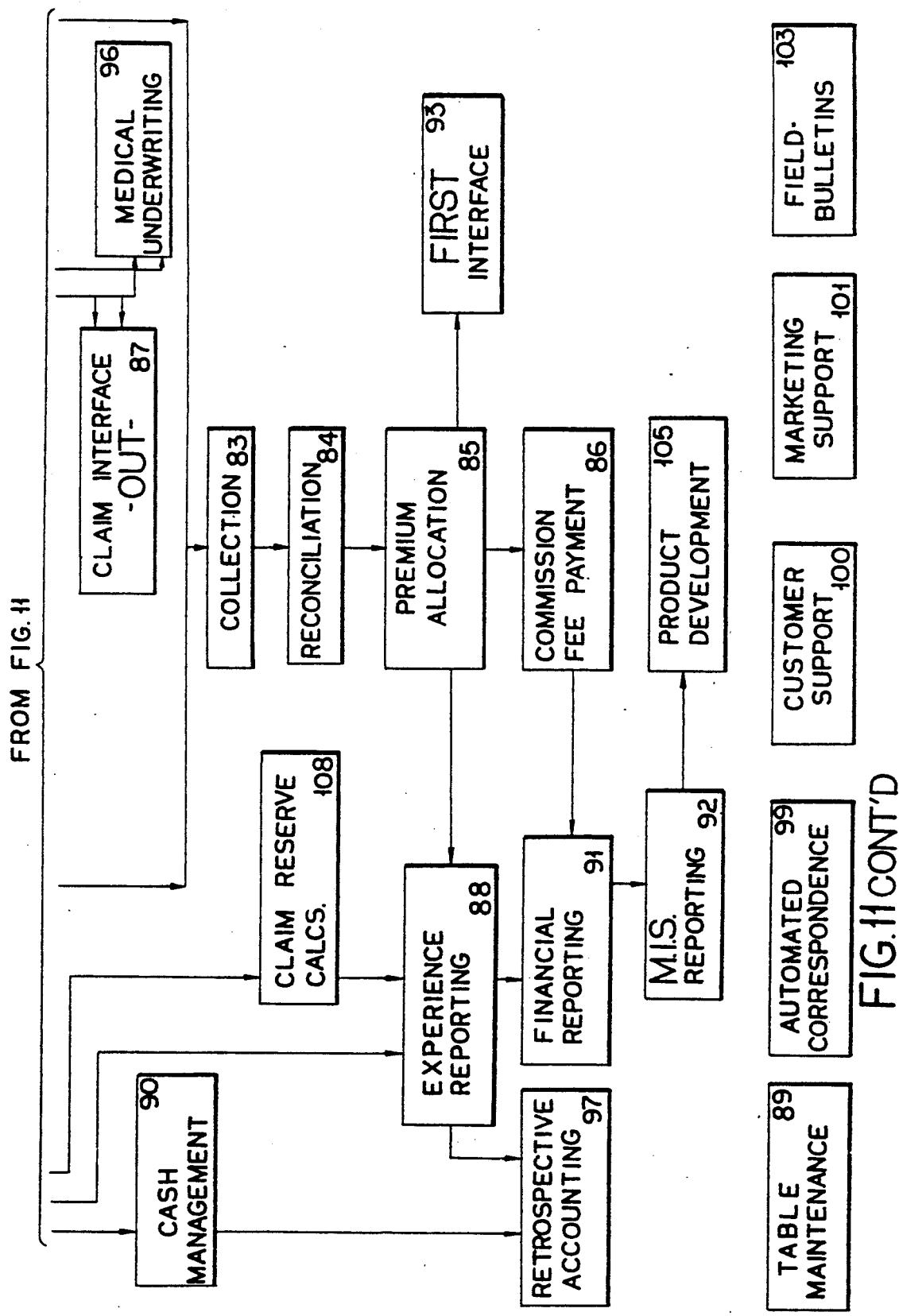

The enterprise group insurance relational data base makes it possible to construct an integrated group insurance information storage, processing and reporting system that is an integration of a plurality of workstation sub-systems applications each of which comprises program modules specific for a different application. The sub-systems interact within the integrated system by processing data from the single enterprise-wide relational data base. This integrated system eliminates redundancy and improves productivity. FIG. 11. is a block diagram which shows the systems functional architecture of a specific embodiment of the invention. This embodiment of the invention comprises approximately forty (40) sub-system program modules which are integrated into the system through the use of the single relational data base. Each block depicts a separate sub-system program module. The arrows of the lines connecting the blocks generally depict the sequence in which the program modules should be implemented in order to construct the enterprise-wide integrated system. This is so because the implementation of the downstream modules may involve the transfer of data that was processed by an upstream program module in the course of business and transferred to downstream program module for further compilation or processing.

FIG. 11 shows the sub-system functional modules as blocks 70 through 109. The different sub-system program modules 70-109 are grouped by function into four different workstation sub-systems, FIG. 12, which make up the overall system.

Figure 12:
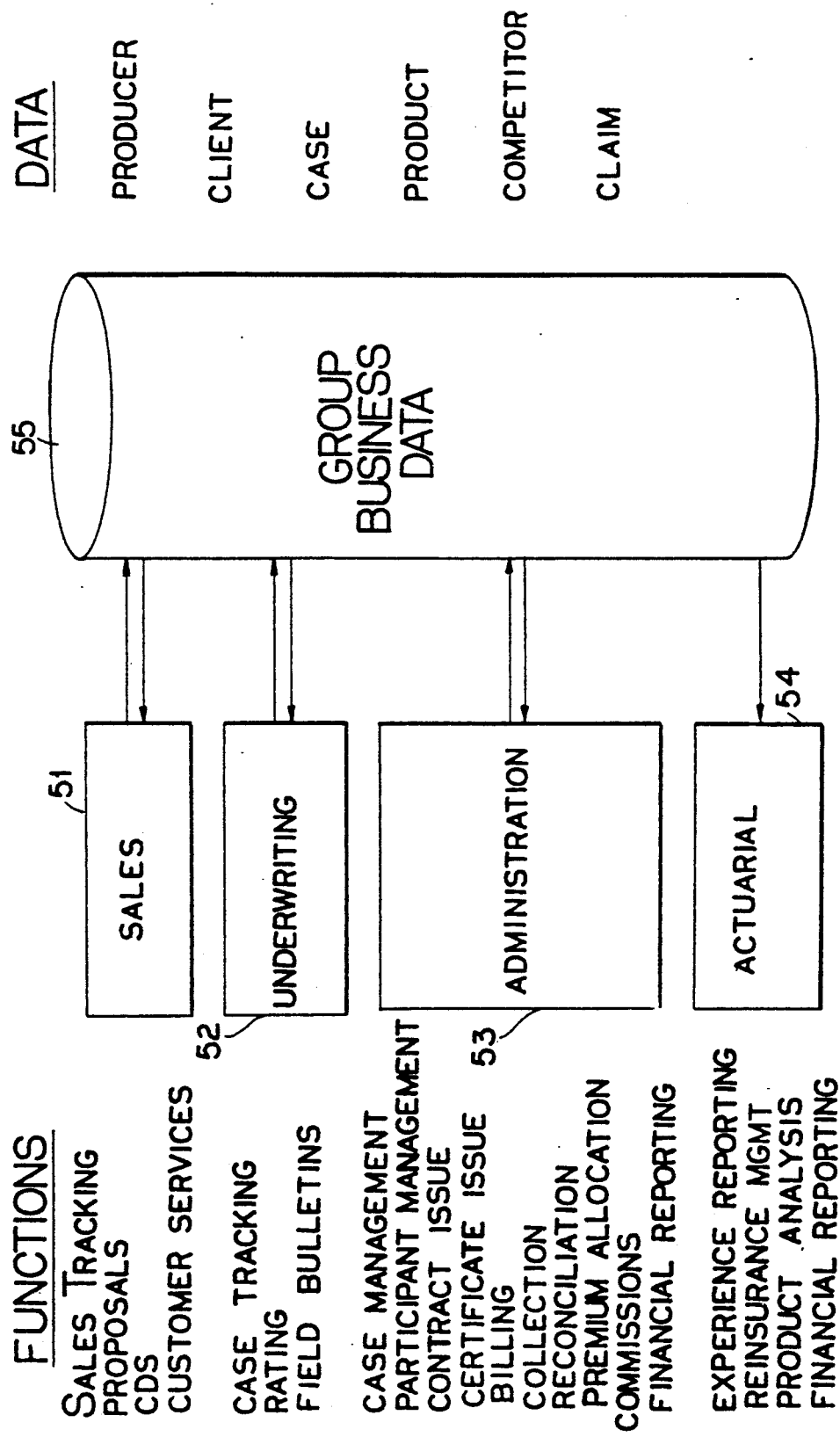
FIG. 12 shows an embodiment of the functional access architecture of an integrated group insurance information storage, processing and reporting system.

Referring to FIG. 12 which is illustrative of the access architecture of the integrated group insurance system according to the invention, the integrated system is composed of the sales 111, underwriting 112, administration 113, and actuarial 114 Workstation sub-systems. Each of the functional workstation sub-systems 111-114 is comprised of a plurality of the functional program modules depicted in FIG. 11. Certain of the functional program modules may be accessible by a plurality of the functional workstations. Each of these functional program modules is connected with the single Group Insurance Relational Business Data Base 115, which contains all of the data concerning each account or case and is structured in accordance with the data model described above. The Group Business Relational Data Base 115, may be accessed from any of the integrated workstations FIG. 13, which are part of the overall system and may be used with any of the sub-system program modules 70-109.

In one embodiment of the invention the integrated workstation will offer menu selections on all four sub-systems 111-114. In another embodiment of the invention each workstation will be dedicated to a workstation sub-system commensurate with the function to be performed by the operator. For example, a sales person's workstation will only provide a menu and access to the sales sub-system 51.

The sales workstation sub-system 111 may contain the Sales Tracking 70, CDS 71, Proposals 74, and Customer Support 100 functional program modules shown in FIG. 11. The underwriting workstation sub-system 112, may contain the Case Tracking 72, Rating 73 and Field Bulletin 103 functional program modules. The Administration workstation sub-system may contain the Case Management 90, Participant Records 76, Contract Certificate Issue 77, Estimated Bills 78, Self Administration Bills 79, List Bills 80, Individual Bills 81, Service Billing 82, Collection 83, Reconciliation 84, Premium Allocation 85, Commission Fee Payment 86 and Financial Reporting 91 functional program modules. The Actuarial workstation sub-system 114 may contain the Experience Reporting 88, Reinsurance Management 94, Product Development 105 and Financial Reporting 91 program modules.

Figure 13:
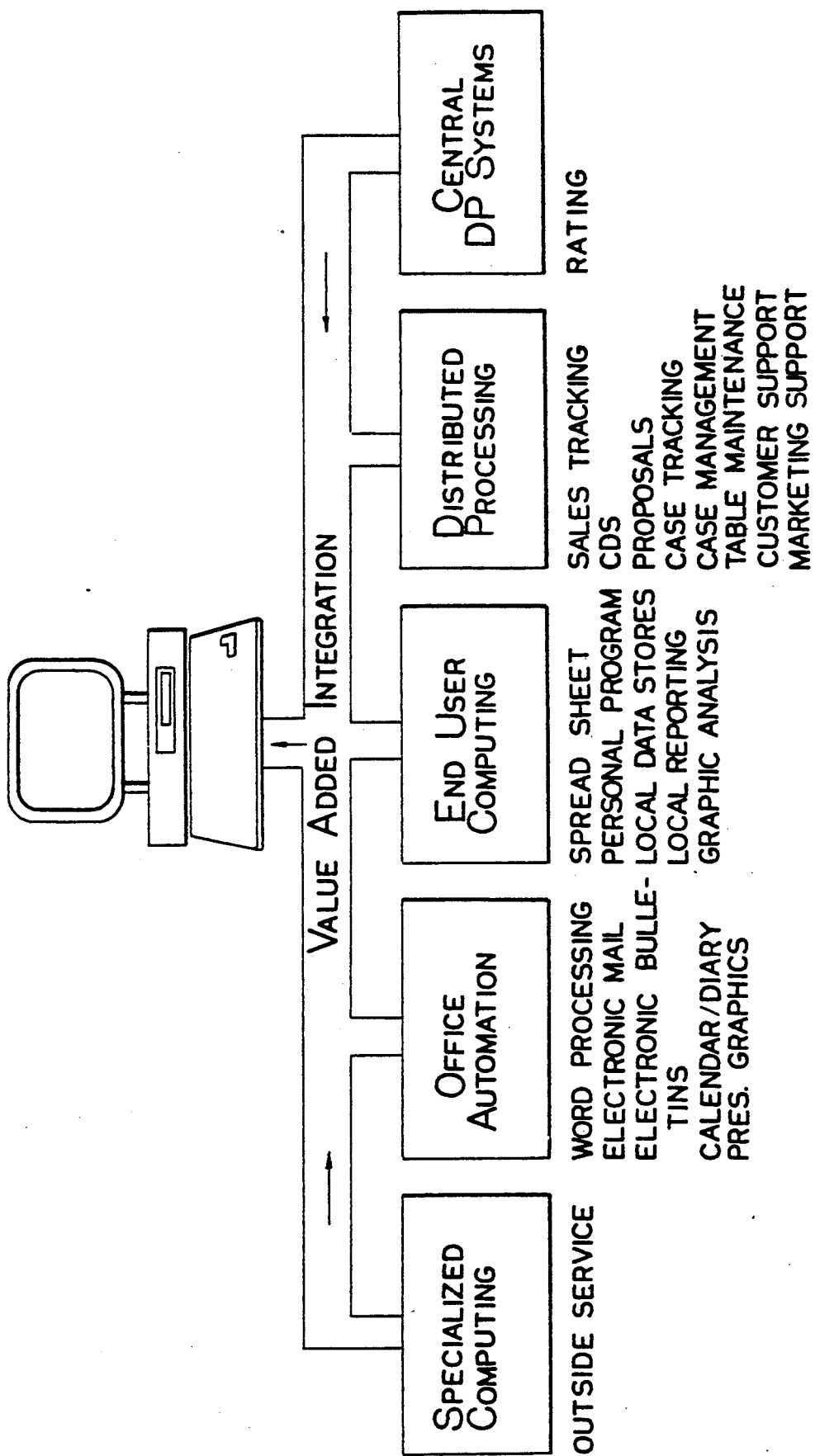
FIG. 13 shows the workstation architecture of an integrated workstation used in one embodiment of the invention.

Each of the workstation sub-systems 111, 112, 113, and 114 and each of the functional program modules 70-109 may be accessed through any integrated workstation 120 of the system as shown in FIG. 13. These integrated workstations are typically dumb terminals or personal computers which are networked to the mainframe and minicomputers of the integrated system. Each integrated workstation thus provides a single information retrieval and input device from which all of the workstations sub-systems, i.e., sales, underwriting, administration and actuarial, may be accessed. It is also possible using this integrated system and workstations to obtain printed copies on a stand-alone printer means of any or selected portions, of the data processed by any of the modules 70-109 of the system.

Each operator of the workstation 120 must enter an access or security code in order to gain access to the system. The access code for each operator will allow access only to the applications programs and the subsystem or systems 111-114, that the operator is permitted to use. The workstation 120 is programmed so that when a client or case name is entered, only the appropriate menu options for the sub-systems 111-114 and connected cluster of modules 70-109 applicable to the operator, client or case appear on the data display screen. In addition, the integrated work station may also provide other computing functions such as, spreadsheets, word processing, calendar, diary, electronic mail, graphics, outside computer "dial up" service, etc.

The individual program modules of the preferred embodiment of the invention are developed using SQL* FORMS and SQL* MENU languages of the ORACLE RDBMS. Data in an organizational format consistent with the relational data base structural model is input into the system by the computer operator in response to questions which appear on the screen when the operator accesses a particular workstation sub-system or program module. The menu-driven integrated system is user-friendly and assures that the operator input data is in a specific organizational format. In this uniform organizational format, the data may be accessed and used by any of the program modules depicted in FIG. 11.

Referring to FIG. 11 the Sales Tracking program module 70 compiles initial pre-sale data about an insurance account or case, its producer, coverage and competitors and allows multiple users on-line access to the data. Data on Renewals, cancellations and additions to existing policies are also tracked with this module. This module 70 tracks the case history with the Insurer from initial contact until the case is sold. Module 70 also generates sales management reports. Some of the initial data compiled and processed on he System on module 70, is electronically transferred to module 71 once the case is sold. The arrows in FIG. 11 show the electronic transfer of compiled and processed data from one program module to another.

The Coverage Description Sheet, program module 71, automates the workflow associated with the completion and distribution of a Coverage Description Sheet ("CDS"). The case information in the CDS is compiled from the initial data in the Sale Tracking module 70 along with any additional data as required. The CDS module 71 provides one central source of case information for all departments within the Insurer to access. The CDS is electronically produced as part of the pre-sale and sold case submissions.

Once a case is sold, the Case Tracking module 72, tracks the case in both the Headquarters Office of the Insurer and the Sales Office until it has completed the new issue process. The Case Tracking module 72 makes on-line inquiry available, and produces warning information to notify management of case problems (i.e., backlog situations, overdue items, etc.). The Case-Tracking module 72 replaces the currently used logging process as it generally exists in insurance underwriting operations.

Using case and census information, the Rating program module 73 will generate manual rates. This function is currently most often contained in stand-alone systems in the insurance underwriting departments. The Module 73 calculates rates for both new and renewal business.

Sales proposals are generated by the Proposals module 74 following a request to quote from a producer or client. The sales proposal outlines the coverages, rates, and restrictions of the Insurer's quote. Custom proposals may be generated by the module 74 to suit individual needs.

After a sale and an account is issued, the Case Management program module 75 performs the day-to-day maintenance of the case information. Changes can be made to the Case Management 75 central data source and all departments may inquire instantaneously and obtain current information reflecting the changes as they are made. Automation of this function reduces field telephone inquiries by offering on-line access to case data and status. The Case rates are maintained and updated as needed and provide a direct feed of such data to the billing modules 78, 79, 80, 81 and 82.

When necessary, detailed records are created, stored, and maintained on an individual's coverage selections, benefit levels, and status on the Participant Record module 76. These records support various list bill applications and claim eligibility and certification activities. The participant records are historically updated as events occur to alter their status. The Participant Records module 76 automates the participant record-maintenance process and also compiles and provides data to generate certificates of insurance and identification cards as required by the client or state statutes.

As Group policyholders or participants select or change coverage or services the Contract Certificate Issue module 77 produces the standard contract pages which outline policy provisions, conditions and obligations. Booklet-certificates (named or generic) are generated by this module 77 at the participant (certificate-holder) level to reflect selected coverages and conditions. In the event of alternate funding, a contract is produced which outlines case flow and banking obligations, limits and other provisions. In-house contract and certificate automation is integrated as applicable with print operations and systems.

The Estimated Billing program module 78 estimates billing on new business until the new issue process is finalized. This module 78 generates a monthly bill for the policyholder based on the premium as estimated by the Sales Representative. A premium reconciliation occurs when the new issue process is completed, and the actual census and premium information is obtained.

A self-administered policyholder maintains all records pertaining to participants and coverage under his Group insurance plan. Self-administered premium statements for such policyholders are generated by the Self-Administered Billing program module 79 on a stated frequency which reflects the coverage, bill mode, bill categories, rate structure and bill location. A separate bill may be prepared for each location or several locations may be combined as desired by the client. The bills generated report census, payroll and premium data including any prior adjustments.

The multi-functional List Billing program module 80 accommodates billing for traditional small group participants in addition to more contemporary and complex applications. Depending on bill frequency, the list bill reflects each participant's elected coverage, benefit, class and premium due for that period. This module 80 provides the support to administer the Health Maintenance Organization/Prefered provider Organization environment, managed healthcare and flexible benefits.

With the advent of COBRA legislation, the capability to produce individual list bills has risen dramatically in importance and is expected to continue. Utilizing the detailed participant and coverage records in storage, the Individual Billing program module 81 generates individual premium statements noting such variables as elected coverage, benefit levels, status, and premium due. The module 81 also provides flexibility to perform other bill applications such as reinsurance, individual conversion and creditor life. Back charges and credits are automatically calculated and the adjustments are reflected on the next premium statement issued.

The Service Fee Billing program module 82 records and manages service fee billing and collection. The automation of Administrative Services Only/Claim Services Only/Health Care Management Systems/COBRA fee billing will reduce expenses and eliminates manual processing. Such services are usually manually billed with the income later booked as a negative expense. By using the Service Fee Billing module 82 the overall handling and profitability of such services and income is more accurately recorded and defined.

When payment is received for products and services rendered, the Collection module 83 accepts, validates and records the monies collected. Payments can be collected directly by check or wire transfer, indirectly through a lock box arrangement or on behalf of a client. This function also provides a detailed audit trail of all cash transactions received by the insurer or on behalf of self-insured clients.

When premium, fee or income payments are collected, the monies received must be reconciled at the banking and trust level and at the client level by the Reconciliation program module 84. Lock box transfers are accurately balanced on a daily basis in terms of paid to, and received amounts. Premium and service fee payments are internally tabulated to verify that the paid amount by the client balances to that reported or billed less any adjustments. Any outstanding balance is noted by the system accordingly.

When payment is received, it is processed to the correct line of business and coverage type by the Premium Allocation program module 85. The premium allocation is internally performed according to the amount of premium paid, coverage type, accounting date, rating method and census input. The flexibility also exists to accommodate the allocation of non-standard premium payments (i.e. retroactive adjustments, net premium remittance etc.). If the premium cannot be properly allocated immediately, an interim suspense file is available. Service fee payments are also allocated within this module 85.

The Commission Fee payment program module 86 creates and maintains producer records and schedules, calculates commission and fee payments (based on a specific schedule), and provides the producer with a detailed financial accounting of transactions. This module 86 has the flexibility to accommodate special handling, tax reporting, and minimum payments. It also provides the capability to issue advances on earned commissions without manual intervention.

The Claim Interface—Out program module 87 compiles and provides common case and participant data to support claim processing activities. If participant records have been captured, the claim interface is used as the source of claimant eligibility information by claim processors. The CDS module 71 interfaces as the source of policy-coverage-class-benefit information necessary for claim calculation and payment processes.

The Experience Reporting program module 88 provides the ability to analyze premiums, claims and exposure information at various levels as appropriate (i.e., ADS, producers, joint ventures, etc.). This aspect of the system allows direct on-line access to this vital information.

The Table Maintenance program module 89 provides the user with greater latitude to create and modify basic system parameters or tables as necessary, and to perform ad hoc reporting. This module provides the user department with substantially more operational control while reducing data processing expenses and improving customer service. For example, by using module 89 adding a new commission schedule would require the user to make a minor change to the appropriate commission table rather than initiate a formal work request.

If an insurer provides claim services to a client, it usually involves the wire transfer of monies to fund claim payments. Depending on the funding method or contract conditions, the Cash Management program module 90 accepts and stores transmitted fund claim payments and census information from various sources and performs a monthly retrospective accounting. A detailed claim reconciliation then supports the request for electronic wire transfer of monies. Automation of the cash management process provides improved financial accounting and experience tracking.

The Financial Reporting program module 91 captures, stores and provides on-line premium and claim information for corporate accounting needs and tax purposes.

The M.I.S. Reporting program module 92 allows on-line access to any information stored in the data base. The ability to provide pre-defined reports, ad hoc reporting, and inquiry capabilities is also available.

Group Premium and loss information is automatically recorded and updated in the company's general ledger system by the First Interface program module 93. The premiums and losses are recorded by line of business or coverage and are passed on a pre-established frequency to integrated applications which need to capture Group financial and experience data for various reporting functions.

Most insurance companies maintain several reinsurance arrangements with various reinsurers. The Reinsurance Management program module 94 tracks and manages participant records and lines of business information necessary for the maintenance and reporting requirements as outlined in the various reinsurance agreements. This single source of information is also available for billing, updates, and records maintenance.

The management, maintenance and availability of contract services data is available on the State Filing Automation program module 95. Flexible on-line access to contract, form and general information within various levels is available to Field and Home Office Personnel through this module 95. The integrity of the captured data is more reliable as a result of efficient forms filing, recording, and cloning processes.

The Medical Underwriting program module 96 automates the workflow and tracks applications within the individual Medical Underwriting area, for both group and special risk business. The module 96 establishes records for each applicant for benefits from data such as applicant's medical condition, the nature of information requested from applicant by the insurer, and application status. The module 96 than generates the correspondence required by the medical underwriting process. Through this module 96, it is possible to also recognize and handle duplicate applications and status changes. Workflow, management, and productivity and status reports as well as routine correspondence can be generated by this module 96. This module 96 provides the Group Medical Underwriters with ad hoc reporting and inquiry capabilities.

At the conclusion of a policy period, an accounting must be performed to determine the case's financial status. At this time retention as well as reserve requirements are calculated and refunds are due. The Retrospective Accounting program module 97 automates the routine calculations that are necessary at the end of an accounting period for each case and provides policyholder and case exhibits. This module 97 allows for alternate funding and monthly accounting Minimum Premium Plans plans to be tracked and monitored with greater accuracy.

The Prospective Pricing program module 98 performs the routine calculations necessary to determine premium needs for a prospective policy period for each case. Rates can be determined and updated as necessary. Formulas can be monitored and maintained within the system in order to assure continuity and consistency from case to case.

It is the responsibility of the group insurance provider to communicate pertinent information on a timely basis to clients, producers, etc. Automation of this correspondence function permits improvement in quality of written communications and ease in distribution. With the creation of internal parameters, the Automated Correspondence program module 99 provides access to mailing and coverages records. This module 99 can identify those to whom statutory, product, legislative, and other insurance information should be conveyed, and selectively disseminate such desired correspondence.

The Customer Support program module 100 provides direct on-line inquiry capabilities of case information so Field and Home Office personnel may better service customers and producers with accurate and timely information (i.e. paid premium, producer commission, installation status, etc.).

The Marketing Support program module 101 provides information necessary for market research activities. The module 101 tracks products by various criteria over time and will lead to the identification of marketing threats and opportunities making possible recommendations to management for disposition.

Group insurers conduct business with various concerns to promote products and services. When a contract is made with an outside vendor or alternative distribution system the Agreement Maintenance program module 102 creates and maintains the specific contractual agreements and procedural language in a central location with access provided to involved departments. The language and procedures are updated by the user and are integrated with case maintenance and fee activities as necessary.

The Field Bulletins program module 103 provides the user with the capability to electronically create and transmit field bulletins to designated personnel and locations. Traditional printing and postage savings are realized while achieving immediate delivery of data. Historical information is maintained on this module 103 and is instantly retrievable should the reference need arise.

Rates and formulas developed by the Insurer's Actuarial department are maintained within the Rates And Formulas program module 104. This allows for immediate and consistent use by other departments and also allows the insurer to respond quickly to changes in the market, the economy, or to products.

The Product Development program module 105 provides information necessary to enhance current products or to develop new products as opportunities are identified. Information can be analyzed and projected in order to reach solutions to threats and opportunities presented in the marketplace.

The Claim Interface—In program module 106 accepts paid claim information from the many different processes and systems utilized in the calculation and payment of claims. It provides support for such applications as cash management, MPP accounting, transfers, Life/ADD/disability claim reserve reporting and tabulations, and experience, financial and M.I.S. reporting. It also provides data for claim services billing and for payment of TPA's, review committees, etc. when such fees are related to claim processes.

The Service Fee Payments program module 107 is used to pay fees for services rendered by third parties, such as those related to HCMS, and to pay fees or other liabilities that may be incurred as a result of managed care and other relationships.

The Claim Reserve Calculations program module 108 manages claim reserves at the claimant level. Life/ADD/LTD state claim reserves are created at the time of notice and are maintained on the module 108 through final payment or disposition. Disability reserves are calculated on a tabular basis using claimant, plan, and claim data.

The Disability Claim System program module 109 is used to process long-term and short-term disability claims. Functions include claim management, benefit calculations, check production and tax withholding, integrated correspondence and diary functions. This sub-system may also include Life and AD&D payments.

Having specifically described a preferred embodiment of the invention, it is apparent that the invention is not limited to such an embodiment and that modifications and variations may be effected by one skilled in the art without departing from the spirit and scope of the invention as defined in the claims.

We claim:

1. An enterprise-wide integrated computer system for storing, processing and reporting information regarding a plurality of group insurance accounts comprising:
   a central processing unit;
   a memory;
   means for storing data concerning each group insurance account in a single relational data base, the relational data base having a structure comprising a plurality of tables in third normal form, each table concerning a specific data subject and wherein the tables are grouped into a plurality of subject categories, each category corresponding to an operating objective of the enterprise on which data is collected;
   means for managing the relational data base;
   a plurality of applications workstation sub-systems including sales, underwriting administration and actuarial sub-systems;

the sales sub-system comprising means for processing sales data including means for communicating with the central processing unit, memory and data storage means and means for accessing defined subject categories on the single relational database and for capturing, modifying and processing data contained in tables of a defined subject category which are necessary for the sales sub-system functions;

the underwriting sub-system comprising means for processing underwriting data including means for communicating with the central processing unit, memory and data storage means and means for accessing defined subject categories on the single relational database and for capturing, modifying and processing data contained in tables of a defined subject category which are necessary for the underwriting sub-system functions;

the administration sub-system comprising means for processing administration data including means for communicating with the central processing unit, memory and data storage means and means for accessing defined subject categories on the single relational database and for capturing, modifying and processing data contained in tables of a defined subject category which are necessary for the administration sub-system functions;

the actuarial sub-system comprising means for processing actuarial data including means for communicating with the central processing unit, memory and data storage means and means for accessing defined subject categories on the single relational database and for capturing, modifying and processing data contained in tables of a defined subject category which are necessary for the actuarial sub-system functions;

means for controlling the access of an operator to each of the workstation sub-systems;

a plurality of workstations each workstation comprising means for inputting data, means for displaying data, and means for selecting, accessing and interacting with the memory means and each of the applications workstation sub-systems; and a printing means.

2. The enterprise-wide integrated system of claim 1 wherein the tables of at least one subject category are clustered and stored in a separate physical location on the means for storing data.

3. An enterprise-wide integrated computer system for storing, processing and reporting information regarding a plurality of group insurance accounts comprising:

a central processing unit;

a memory;

means for storing data concerning each group insurance account, including data on policyholders, coverage rate, participant restrictions, premiums, commissions, clients, claims, products, producers, competitors cases, payments, bills, provisions, obligation conditions, exposure fees, income, schedules, and reinsurance in a single relational data base;

means for managing the relational data base including means for creating tables to contain the data stored on the data base and means for modifying, storing, retrieving and manipulating the data;

the relational data base having a structure comprising a plurality of third normal form tables, grouped in a plurality of subject categories including a Case subject category, a Claims subject category, a Client subject category, a Competitor subject category, a Coverage subject category and a Producer subject category;

a plurality of applications workstation sub-systems including sales, underwriting, administration and actuarial sub-systems;

the sales sub-system comprising means for processing sales data comprising means for tracking the history of each account, means for generating reports on the case history of each account, means for producing policyholder, coverage, rate and participant data, means for generating sales proposals outlining the coverage, rates and restrictions for an account, means for communicating with the central processing unit and memory, and means for modifying and accessing sales data in the single relational data base;

the underwriting sub-system comprising means for processing underwriting data comprising case tracking means for tracking and logging tasks associated with each account after, sale, notification means for generating reports for notifying personnel of tasks to be performed, rate means for calculating rates and generating manual sales based on case and census information, means for generating field bulletins comprising information specified from the underwriting data processing means, means for communicating with the central processing unit and memory, and means for modifying and accessing underwriting data stored in the single relational data base;

the administration sub-system comprising means for processing administration data comprising case management means for maintaining and updating information on each account once the account has issued, means for creating, storing and maintaining records on individual account participants concerning coverage, benefit levels and status, means for generating certificates of insurance and participant identification cards, means for producing printed standard contracts outlining policy provisions, conditions and obligations and other provisions, means for producing printed individual participant certificates outlining selected coverage and conditions, means for generating bills at specified intervals for each account or account participant, means for recording and validating payment of bills, means for reconciling payments received for premiums, fees or income with client data, means for processing premium payments to each account and coverage type, commission processing means for calculating commissions due on each account, taxes, minimum payments and issuing advances on earned commissions, means for storing and providing premium and claim information for accounting and tax purposes, means for communicating with the central processing unit and memory, and means for accessing and modifying the administration data stored on the single relational data base;

the actuarial sub-system comprising means for processing actuarial data comprising means for accessing premium, claim and exposure information at a plurality of levels, means for maintaining and reporting the requirements of any reinsurance agreements for an account, and financial reporting means for storing and providing premium and claim information, means for communicating with the central processing unit and memory, and means for accessing and modifying actuarial data stored on the memory means single relational data base;

security means for controlling the access by an operator of the system to each of the workstation sub-systems;

a plurality of workstations each workstation comprising means for inputting data, means for displaying data, and means for selecting, accessing and interacting with each of the stored program controlled data processing means; and a printing means.

4. A computerized enterprise-wide integrated group insurance information processing and reporting system, comprising in combination, data entry means, data display means, a central processing unit, a memory, data storage means for storing data in a relational data base, a plurality of applications programs, and a relational data base management systems program, the data base being a single relational data base having a data structure comprising a plurality of third normal form relational tables:

the tables being organized into a plurality of subject categories, each subject category corresponding to an operating objective of the enterprise, the subject categories comprising;

a) a Case subject category comprising tables that contain data on the case description, activity history, coverage available, policy level, participants, coverage in-force, billing, producers and commissions;

b) a Claim subject category comprising tables that contain data concerning the requests from a participant for reimbursement for an incurred procedure or loss;

c) a Client subject category comprising tables that contain data describing the client, client locations, and the insured person;

d) a Competitor subject category comprising tables that contain data on competitor coverage rates;

e) a Coverage subject category comprising tables that contain data concerning rules and options of the insurance products marketed by the enterprise, coverage, services, and funding methods; and f) a Producer subject category comprising tables containing data on the persons or firms who sell or administer products or services on behalf of the enterprise and commission schedules:

each subject category being acceptable to at least one of the applications programs.

5. The system of claim 4, wherein one or more of the subject categories are stored as a clusters in separate physical locations in the means for storing data.

6. A method of constructing an enterprise wide integrated computer system for storing, processing and reporting information regarding a plurality of group insurance accounts comprising, providing a computer system which in combination includes, a central processing unit, a memory, means for storing data, a plurality of workstations and printing means, providing a relational database management system means for managing a relational database and for creating tables to contain data stored on a single relational database and means for modifying, storing and retrieving and manipulating the database, providing a single relational database having a data structure comprising a plurality of third normal form relational tables, the tables being organized into a plurality of subject categories, each subject category corresponding to an operating objective of the enterprise, the subject categories comprising:

a) a Case subject category comprising tables that contain data on the case description, activity history, coverage available, policy level, participants, coverage in force, billing, producers and commissions;

b) a Claim category comprising tables that contain data concerning the request from a participant for reimbursement for an incurred procedure or loss;

c) a Client subject category comprising tables that contain data describing the client, client locations, and the insured person;

d) a competitor subject category comprising tables that contain data on competitor coverage rates;

e) a Coverage subject category comprising tables that contain data concerning rules and options of the insurance products marketed by the enterprise, coverage, services and funding methods; and f) a Producer subject category comprising tables containing data on the persons or firms who sell or administer products or services on behalf of the enterprise and commission schedules; storing the single relational database on the means for storing data of the computer system;

providing a plurality of workstation application sub-systems including sales, underwriting, administration and actuarial sub-systems, each sub-system comprising a plurality of application program modules, each sub-system application program module comprising means for processing, modifying, storing and manipulating data on the single relational database;

providing security means for controlling the access by an operator of the system to each of the work station application sub-systems, the security means also comprising means for restricting the access of the operator of a specific sub-system application program module to tables on the single relational database which contain data related to the application program module.

7. The method of claim 6 wherein the tables of each of the Claim, Client, Competitor, Coverage, and Producer subject categories are clustered and stored in separate physical locations in the means for storing data.

* * * * *